United States Patent
Hofman et al.

(10) Patent No.: US 9,582,871 B2
(45) Date of Patent: Feb. 28, 2017

(54) SYSTEM AND METHOD FOR FILTERING DATA CAPTURED BY A 3D CAMERA

(71) Applicant: Technologies Holdings Corp., Houston, TX (US)

(72) Inventors: Henk Hofman, Lemmer (NL); Cor de Ruijter, Staphorst (NL); Menno Koekoek, Dronten (NL); Peter Willem van der Sluis, IJsselmuiden (NL)

(73) Assignee: Technologies Holdings Corp., Houston, TX (US)

( * ) Notice: Subject to any disclaimer, the term of this patent is extended or adjusted under 35 U.S.C. 154(b) by 0 days.

(21) Appl. No.: 14/842,874

(22) Filed: Sep. 2, 2015

(65) Prior Publication Data

US 2015/0379705 A1 Dec. 31, 2015

Related U.S. Application Data

(63) Continuation of application No. 14/695,279, filed on Apr. 24, 2015, now Pat. No. 9,183,623, which is a
(Continued)

(51) Int. Cl.
*G06T 7/00* (2006.01)
*A01J 5/007* (2006.01)
(Continued)

(52) U.S. Cl.
CPC ............. *G06T 7/0004* (2013.01); *A01J 5/007* (2013.01); *A01J 5/0175* (2013.01);
(Continued)

(58) Field of Classification Search
CPC ...... A01K 29/00; A01K 11/008; A01K 1/126; A01K 11/006; A01J 5/0175; A01J 5/007;
(Continued)

(56) References Cited

U.S. PATENT DOCUMENTS 2,731,300 A 1/1956 Jansen ........................ 299/111
2,830,559 A 4/1958 McMurray .................. 119/159
(Continued)

FOREIGN PATENT DOCUMENTS

| AT | 386 922 B | 11/1988 | ............... A01J 7/00 |
| AT | 387 686 B | 2/1989 | ............... A01J 5/01 |

(Continued)

OTHER PUBLICATIONS

PCT Invitation to Pay Additional Fees and, Where Applicable, Protest Fee and Partial National Search Report for Application No. PCT/US2012/035077; 7 pages, Jul. 25, 2012.
(Continued)

*Primary Examiner* — Tom Y Lu
(74) *Attorney, Agent, or Firm* — Baker Botts L.L.P.

(57) ABSTRACT

A system for processing an image comprises a three-dimensional camera that captures an image of a dairy livestock and a processor communicatively coupled to the three-dimensional camera. The processor accesses a first pixel having a first depth location, a second pixel having a second depth location, and a third pixel having a third depth location. The processor determines that the second pixel is an outlier among the first pixel and the third pixel based upon the first depth location, the second depth location, and the third depth location, and discards the second pixel from the image based at least in part upon the determination.

14 Claims, 12 Drawing Sheets

Related U.S. Application Data continuation of application No. 13/448,840, filed on Apr. 17, 2012, now Pat. No. 9,058,657, which is a continuation-in-part of application No. 13/095,994, filed on Apr. 28, 2011, now Pat. No. 8,671,885.

(51) Int. Cl.
| | | |
|---|---|---|
| *A01J 5/017* | (2006.01) | |
| *A01K 29/00* | (2006.01) | |
| *H04N 7/18* | (2006.01) | |
| *H04N 13/02* | (2006.01) | |

(52) U.S. Cl.
CPC ............ *A01K 29/005* (2013.01); *G06T 7/004* (2013.01); *G06T 7/0075* (2013.01); *H04N 7/18* (2013.01); *H04N 7/183* (2013.01); *H04N 13/0203* (2013.01); *G06T 2207/10028* (2013.01); *G06T 2207/30128* (2013.01)

(58) Field of Classification Search
CPC ............ A01J 7/04; G06T 2207/10028; G06T 2207/30004; G06T 2207/30128; G06T 7/0012; G06T 17/00; G06T 2200/04; G06T 7/004; G06T 7/0042; G06T 17/005; G06T 19/006
USPC ....... 382/254, 257, 258, 259, 266, 267, 268, 382/274, 275
See application file for complete search history.

(56) References Cited

U.S. PATENT DOCUMENTS

| | | | |
|---|---|---|---|
| 3,174,457 A | 3/1965 | Lyttle et al. ................ 119/1 |
| 3,835,814 A | 9/1974 | Jacobs et al. ............. 119/14.04 |
| 4,306,454 A | 12/1981 | Olrik et al. ................... 73/224 |
| 4,508,058 A | 4/1985 | Jakobson et al. .......... 119/14.02 |
| 4,617,876 A | 10/1986 | Hayes ............................ 119/155 |
| 4,726,322 A | 2/1988 | Torsius ...................... 119/14.14 |
| 4,735,172 A | 4/1988 | Wahlström et al. ......... 119/14.1 |
| 4,819,875 A | 4/1989 | Beal ............................... 239/97 |
| 4,867,103 A | 9/1989 | Montalescot et al. ...... 119/14.08 |
| 4,941,433 A | 7/1990 | Hanauer ..................... 119/14.02 |
| 5,020,477 A | 6/1991 | Dessing et al. ............ 119/14.08 |
| 5,069,160 A | 12/1991 | Street et al. ............... 119/14.08 |
| 5,088,447 A | 2/1992 | Spencer et al. ............ 119/51.02 |
| 5,285,746 A | 2/1994 | Moreau ...................... 119/14.03 |
| 5,379,721 A | 1/1995 | Dessing et al. ............ 119/14.08 |
| 5,479,876 A | 1/1996 | Street et al. ............... 119/14.08 |
| 5,553,569 A | 9/1996 | Street et al. ................. 119/525 |
| 5,596,945 A | 1/1997 | van der Lely ............. 119/14.03 |
| 5,666,903 A | 9/1997 | Bull et al. ................... 119/14.01 |
| 5,678,506 A | 10/1997 | van der Berg et al. .... 119/14.18 |
| 5,718,185 A | 2/1998 | Pichler et al. ............. 119/14.04 |
| 5,722,343 A | 3/1998 | Aurik et al. ............... 119/14.02 |
| 5,784,994 A | 7/1998 | van der Lely ............. 119/14.08 |
| 5,816,190 A | 10/1998 | van der Lely ............. 119/14.08 |
| 5,862,776 A | 1/1999 | van den Berg ............. 119/14.1 |
| 5,918,566 A | 7/1999 | van den Berg ............ 119/14.02 |
| 5,934,220 A | 8/1999 | Hall et al. .................. 119/14.08 |
| 5,979,359 A | 11/1999 | Hansson ..................... 119/14.08 |
| 6,050,219 A | 4/2000 | van der Lely ............. 119/14.08 |
| 6,055,930 A | 5/2000 | Stein et al. ................. 119/14.08 |
| 6,105,536 A | 8/2000 | DeWaard .................... 119/14.04 |
| 6,118,118 A | 9/2000 | van der Lely et al. ....... 250/221 |
| 6,167,839 B1 | 1/2001 | Isaksson et al. ........... 119/14.08 |
| 6,189,486 B1 | 2/2001 | Lindholm .................. 119/14.02 |
| 6,205,949 B1 | 3/2001 | van den Berg ............ 119/14.02 |
| 6,213,051 B1 | 4/2001 | Fransen ..................... 119/14.08 |
| 6,227,142 B1 | 5/2001 | Birk ........................... 119/14.08 |
| 6,234,109 B1 | 5/2001 | Andersson et al. ........ 119/14.08 |
| 6,257,169 B1 | 7/2001 | Oosterling ................. 119/14.02 |
| 6,321,682 B1 | 11/2001 | Eriksson et al. ........... 119/14.44 |
| 6,323,942 B1 | 11/2001 | Bamji ........................ 356/5.01 |
| 6,341,575 B1 | 1/2002 | Forsén ....................... 119/14.08 |
| 6,363,883 B1 | 4/2002 | Birk ........................... 119/14.08 |
| 6,401,654 B1 | 6/2002 | Hallsten et al. ............ 119/14.18 |
| 6,443,094 B1 | 9/2002 | DeWaard .................... 119/14.18 |
| 6,532,892 B1 | 3/2003 | Nilsson ...................... 119/14.03 |
| 6,543,381 B1 | 4/2003 | Birk et al. .................. 119/14.08 |
| 6,549,289 B1 | 4/2003 | Ellis ............................ 356/603 |
| 6,553,942 B1 | 4/2003 | Eriksson .................... 119/670 |
| 6,568,352 B2 | 5/2003 | Fransen ...................... 119/668 |
| 6,591,784 B1 | 7/2003 | Eriksson .................... 119/670 |
| 6,626,130 B1 | 9/2003 | Eriksson .................... 119/670 |
| 6,729,262 B2 | 5/2004 | Ealy et al. .................. 119/14.08 |
| 6,864,914 B1 | 3/2005 | Birk .......................... 348/211.99 |
| 6,974,373 B2 | 12/2005 | Kriesel ....................... 452/157 |
| 6,976,644 B2 | 12/2005 | Troudt ....................... 239/587.1 |
| 7,039,220 B2 | 5/2006 | Kriesel ....................... 382/110 |
| 7,128,020 B2 | 10/2006 | Björk et al. ................ 119/14.18 |
| 7,146,928 B2 | 12/2006 | Ealy et al. .................. 119/14.08 |
| 7,246,571 B2 | 7/2007 | Van Den Berg et al. .. 119/14.08 |
| 7,299,766 B2 | 11/2007 | Van Den Berg et al. .. 119/14.02 |
| 7,377,232 B2 | 5/2008 | Holmgren et al. ........... 119/670 |
| 7,690,327 B2 | 4/2010 | Van Den Berg ........... 119/14.02 |
| 7,882,802 B2 | 2/2011 | Van Den Berg et al. .. 119/14.08 |
| 8,036,429 B2 | 10/2011 | Doyle, II .................... 382/110 |
| 8,074,600 B2 | 12/2011 | Källén et al. .............. 119/14.04 |
| 8,210,122 B2 | 7/2012 | Pettersson et al. ......... 119/14.08 |
| 8,385,684 B2* | 2/2013 | Sandrew ............ H04N 13/0267 358/517 |
| 8,934,711 B2* | 1/2015 | Park ........................ G06F 5/003 382/162 |
| 2001/0024514 A1 | 9/2001 | Matsunaga .................. 382/106 |
| 2002/0108576 A1 | 8/2002 | Lely et al. .................. 119/14.02 |
| 2003/0097990 A1 | 5/2003 | Bjork et al. ................ 119/14.08 |
| 2003/0198378 A1* | 10/2003 | Ng ............................. G06K 9/20 382/154 |
| 2004/0032974 A1 | 2/2004 | Kriesel ....................... 382/110 |
| 2004/0103846 A1 | 6/2004 | Fransen ...................... 119/14.03 |
| 2005/0223997 A1 | 10/2005 | Umegard .................... 119/14.03 |
| 2006/0196431 A1 | 9/2006 | Kaever et al. .............. 119/14.04 |
| 2007/0137579 A1 | 6/2007 | Osthues et al. ............. 119/14.03 |
| 2007/0223057 A1 | 9/2007 | Berestov ..................... 358/463 |
| 2007/0245964 A1 | 10/2007 | Van Den Berg et al. .. 119/14.08 |
| 2007/0277737 A1 | 12/2007 | Maier et al. ................ 119/14.45 |
| 2008/0202432 A1 | 8/2008 | Petterson .................... 119/14.03 |
| 2009/0185800 A1 | 7/2009 | Lee et al. ..................... 396/213 |
| 2010/0031889 A1 | 2/2010 | Eriksson et al. ........... 119/14.02 |
| 2010/0079581 A1 | 4/2010 | Russell et al. ................ 348/46 |
| 2010/0095893 A1 | 4/2010 | Kallen et al. .............. 119/14.04 |
| 2010/0186675 A1 | 7/2010 | Van Den Berg ........... 119/14.03 |
| 2010/0282172 A1 | 11/2010 | Eriksson et al. ........... 119/14.02 |
| 2010/0289649 A1 | 11/2010 | Holmgren et al. ......... 340/573.3 |
| 2011/0102438 A1* | 5/2011 | Mathe ...................... G06F 3/017 345/426 |
| 2011/0114024 A1 | 5/2011 | Van Den Berg ........... 119/14.02 |
| 2011/0239945 A1 | 10/2011 | Van Den Berg ........... 119/14.02 |
| 2011/0245975 A1* | 10/2011 | Daubner ................. A01J 5/0175 700/259 |
| 2012/0000427 A1 | 1/2012 | Nilsson ...................... 119/14.02 |
| 2012/0006269 A1 | 1/2012 | McCain et al. ............ 119/14.02 |
| 2012/0048207 A1 | 3/2012 | Hofman et al. ............. 119/651 |
| 2012/0048208 A1 | 3/2012 | Hofman et al. ............. 119/651 |
| 2012/0173184 A1* | 7/2012 | Ovsiannikov ........... G01S 17/08 702/97 |
| 2012/0180729 A1 | 7/2012 | Van Dorp .................. 119/14.08 |
| 2015/0110414 A1* | 4/2015 | Cho ...................... H04N 13/0022 382/254 |
| 2015/0228057 A1* | 8/2015 | Ishigami ................ G06T 7/0075 382/274 |

FOREIGN PATENT DOCUMENTS

| | | | | |
|---|---|---|---|---|
| AT | 404 537 B | 12/1998 | ............ | A01J 7/04 |
| AT | 406 108 B | 2/2000 | ............ | A01J 5/00 |
| AU | 2005222545 A1 | 11/2005 | ............ | A01J 5/017 |
| CA | 1 253 956 | 5/1989 | ............ | A01J 7/00 |
| CA | 2 313 533 A1 | 6/1999 | ............ | G06T 1/00 |
| CA | 2315018 A1 | 7/1999 | ............ | G06T 1/00 |
| DE | 37 42 867 A1 | 7/1989 | ............ | A01J 5/017 |
| DE | 39 38 077 A1 | 5/1991 | ............ | A01J 5/017 |

(56) References Cited

FOREIGN PATENT DOCUMENTS

| | | | | |
|---|---|---|---|---|
| DE | 689 19 414 T3 | 5/1995 | ............ | A01J 5/017 |
| DE | 691 16 926 T2 | 11/1996 | ............ | A01J 5/017 |
| DE | 196 36 551 A1 | 3/1998 | ............ | A01J 5/017 |
| DE | 689 28 489 T2 | 4/1998 | ............ | A01J 5/00 |
| DE | 38 75 414 T3 | 8/1999 | ............ | A01J 5/00 |
| DE | 691 32 321 T2 | 2/2001 | ............ | A01J 5/017 |
| DE | 102 12 676 C1 | 3/2002 | ............ | A01K 1/12 |
| DK | 144542 B | 5/1980 | ............ | A01J 7/00 |
| DK | 147721 B | 7/1981 | ............ | A01J 5/04 |
| DK | 218482 A | 11/1983 | ............ | A01J 5/10 |
| DK | 328482 A | 1/1984 | ............ | A01J 7/00 |
| DK | 169247 B1 | 9/1994 | ............ | A01J 5/00 |
| DK | 173139 B1 | 6/1998 | ............ | A01J 5/04 |
| EP | 0 188 303 A1 | 7/1986 | ............ | A01J 7/00 |
| EP | 0 209 202 A1 | 1/1987 | ............ | A01J 7/00 |
| EP | 0 229 682 A1 | 7/1987 | ............ | A01J 7/00 |
| EP | 0 232 568 A1 | 8/1987 | ............ | G01S 15/88 |
| EP | 0 119 222 B1 | 4/1988 | ............ | A01J 5/04 |
| EP | 0 300 582 A1 | 1/1989 | ............ | A01J 7/00 |
| EP | 0 306 579 A1 | 3/1989 | ............ | A01J 7/00 |
| EP | 0 309 036 A1 | 3/1989 | ............ | A01J 7/00 |
| EP | 0 327 037 A2 | 8/1989 | ............ | A01M 7/00 |
| EP | 0 329 248 A1 | 8/1989 | ............ | A01J 7/00 |
| EP | 0 349 019 A2 | 1/1990 | ............ | A01J 5/08 |
| EP | 0 360 354 A1 | 3/1990 | ............ | A01J 7/00 |
| EP | 0 432 148 A2 | 6/1991 | ............ | A01K 1/12 |
| EP | 0 440 313 A1 | 8/1991 | ............ | G01S 15/42 |
| EP | 0 448 132 A2 | 9/1991 | ............ | A01J 7/00 |
| EP | 0 455 305 A1 | 11/1991 | ............ | G01S 7/48 |
| EP | 0 467 489 A1 | 1/1992 | ............ | A01J 7/00 |
| EP | 0 472 247 A2 | 2/1992 | ............ | A01J 7/00 |
| EP | 0 479 397 A2 | 4/1992 | ............ | A01J 7/00 |
| EP | 0 511 722 A2 | 11/1992 | ............ | A01D 7/00 |
| EP | 0 511 723 A2 | 11/1992 | ............ | A01D 7/00 |
| EP | 0 516 246 A2 | 12/1992 | ............ | A01D 7/00 |
| EP | 0 541 517 A2 | 5/1993 | ............ | A01J 7/00 |
| EP | 0 545 916 A2 | 6/1993 | ............ | A01J 7/00 |
| EP | 0 548 058 A2 | 6/1993 | ............ | A01K 1/12 |
| EP | 0 553 940 A2 | 8/1993 | ............ | A01J 7/00 |
| EP | 0 565 189 A2 | 10/1993 | ............ | A01J 7/00 |
| EP | 0 574 089 A2 | 12/1993 | ............ | G01S 7/48 |
| EP | 0 630 558 A2 | 12/1994 | ............ | A01J 7/00 |
| EP | 0 634 097 A1 | 1/1995 | ............ | A01K 1/12 |
| EP | 0 643 907 A2 | 3/1995 | ............ | A01J 7/00 |
| EP | 0 688 498 A2 | 12/1995 | ............ | A01J 7/00 |
| EP | 0 689 762 A1 | 1/1996 | ............ | A01K 1/12 |
| EP | 0 779 025 A2 | 6/1997 | ............ | A01J 5/017 |
| EP | 0 789 995 A1 | 8/1997 | ............ | A01J 7/04 |
| EP | 0 824 857 A1 | 2/1998 | ............ | A01J 7/02 |
| EP | 0 880 889 A2 | 12/1998 | ............ | A01J 5/017 |
| EP | 0 900 522 A1 | 3/1999 | ............ | A01J 5/017 |
| EP | 0 951 651 B1 | 10/1999 | ............ | G01S 17/00 |
| EP | 1 089 614 B1 | 4/2001 | ............ | A01J 7/02 |
| EP | 1 211 928 B1 | 6/2002 | ............ | A01J 5/017 |
| EP | 1 253 440 A1 | 10/2002 | ............ | G01S 7/481 |
| EP | 1 316 253 A2 | 11/2002 | ............ | A01K 1/12 |
| EP | 1 279 327 A2 | 1/2003 | ............ | A01J 5/017 |
| EP | 1 388 281 A1 | 2/2004 | ............ | A01J 7/02 |
| EP | 1 447 002 A1 | 8/2004 | ............ | A01J 5/017 |
| EP | 1 460 453 A1 | 9/2004 | ............ | G01S 17/89 |
| EP | 1 520 468 A1 | 4/2005 | ............ | A01J 7/04 |
| EP | 1 537 774 A1 | 6/2005 | ............ | A01J 5/017 |
| EP | 1 537 775 A1 | 6/2005 | ............ | A01J 5/017 |
| EP | 1 523 882 A2 | 3/2009 | ............ | A01K 1/12 |
| ES | 2 064 892 T3 | 2/1995 | ............ | A01J 5/017 |
| FI | 88099 B | 12/1992 | ............ | A01J 7/00 |
| FI | 20002169 A | 4/2002 | ............ | A01J 5/01 |
| FR | 2 595 197 A | 9/1987 | ............ | A01J 5/017 |
| GB | 2 184 233 A | 6/1987 | ............ | G01N 21/89 |
| GB | 2 218 888 A | 11/1989 | ............ | A01J 7/00 |
| GB | 2 258 382 A | 2/1993 | ............ | A01J 7/00 |
| JP | 62-159078 A | 7/1987 | ............ | A01J 5/00 |
| JP | 9-196631 A | 7/1997 | ............ | G01B 11/00 |
| JP | 9-243315 A | 9/1997 | ............ | A01J 5/00 |
| JP | 9-275834 A | 10/1997 | ............ | A01J 5/00 |
| JP | 9-285234 A | 11/1997 | ............ | A01J 5/00 |
| JP | 11-276002 A | 10/1999 | ............ | A01J 5/00 |
| JP | 11-281340 A | 10/1999 | ............ | A01J 5/00 |
| JP | 2001-504944 A | 4/2001 | ............ | A01J 5/00 |
| JP | 2002-521007 A | 7/2002 | ............ | A01J 5/00 |
| JP | 2002-253075 A | 9/2002 | ............ | A01J 5/00 |
| NL | 8502039 A | 2/1987 | ............ | A01J 5/017 |
| NL | 8503580 A | 7/1987 | ............ | A01J 5/00 |
| NL | 8600076 A | 8/1987 | ............ | A01J 5/00 |
| NL | 8602699 A | 5/1988 | ............ | A01J 5/017 |
| NL | 8800042 A | 8/1989 | ............ | A01J 5/017 |
| NL | 8801785 A | 2/1990 | ............ | A01J 5/017 |
| NL | 9101088 A | 1/1993 | ............ | A01J 7/00 |
| NL | 9201434 A | 3/1994 | ............ | A01J 5/017 |
| NL | 9201902 A | 6/1994 | ............ | A01J 5/017 |
| NL | 9400220 A | 9/1995 | ............ | A01J 5/017 |
| NL | 9400471 A | 11/1995 | ............ | A01J 5/017 |
| NL | 9500276 A | 9/1996 | ............ | A01J 5/017 |
| NL | 9500277 A | 9/1996 | ............ | A01J 5/017 |
| NL | 9500363 A | 10/1996 | ............ | A01J 5/017 |
| NL | 9500566 A | 11/1996 | ............ | A01J 5/01 |
| NL | 1 009 632 C2 | 7/1998 | ............ | A01J 5/017 |
| NL | 1006804 C2 | 2/1999 | ............ | A01J 5/00 |
| NL | 1009711 C2 | 1/2000 | ............ | A01J 5/00 |
| NL | 1013026 C2 | 3/2001 | ............ | A01J 5/017 |
| NL | 1018563 C1 | 1/2003 | ............ | A01J 5/017 |
| SE | 419 901 B | 8/1981 | ............ | A01J 7/00 |
| SE | 425 821 B | 11/1982 | ............ | A01J 7/00 |
| SE | 433 553 B | 6/1984 | ............ | A01J 5/10 |
| SE | 512 334 C2 | 2/2000 | ............ | A01J 5/017 |
| WO | WO 96/20587 A1 | 7/1996 | ............ | A01J 5/017 |
| WO | WO 97/15183 A1 | 5/1997 | ............ | A01J 5/017 |
| WO | WO 97/15901 A1 | 5/1997 | ............ | G06T 7/00 |
| WO | WO 97/37528 A1 | 10/1997 | ............ | A01J 5/017 |
| WO | WO 98/01022 A1 | 1/1998 | ............ | A01J 5/017 |
| WO | WO 98/35547 A1 | 8/1998 | ............ | A01J 5/017 |
| WO | WO 98/44782 A1 | 10/1998 | ............ | A01J 5/017 |
| WO | WO 98/45808 A1 | 10/1998 | ............ | G06T 1/00 |
| WO | WO 98/47348 A1 | 10/1998 | ............ | A01J 5/017 |
| WO | WO 99/09430 A2 | 2/1999 | ............ | G01S 17/00 |
| WO | WO 99/30277 A1 | 6/1999 | ............ | G06T 1/00 |
| WO | WO 99/33020 A1 | 7/1999 | ............ | G06T 1/00 |
| WO | WO 00/04763 A1 | 2/2000 | ............ | A01J 5/017 |
| WO | WO 00/04765 A1 | 2/2000 | ............ | A01J 5/017 |
| WO | WO 00/11935 A1 | 3/2000 | ............ | A01J 5/017 |
| WO | WO 00/11936 A1 | 3/2000 | ............ | A01J 5/017 |
| WO | WO 00/11940 A1 | 3/2000 | ............ | A01K 11/00 |
| WO | WO 00/62602 A1 | 10/2000 | ............ | A01J 5/017 |
| WO | WO 01/19171 A1 | 3/2001 | ............ | A01J 5/017 |
| WO | WO 01/19172 A1 | 3/2001 | ............ | A01J 5/017 |
| WO | WO 01/52633 A1 | 7/2001 | ............ | A01J 5/017 |
| WO | WO 02/00011 A1 | 1/2002 | ............ | A01J 5/017 |
| WO | WO 02/07098 A1 | 1/2002 | ............ | G06T 7/00 |
| WO | WO 02/15676 A1 | 2/2002 | ............ | A01J 5/017 |
| WO | WO 02/082201 A1 | 10/2002 | ............ | G05D 1/02 |
| WO | WO 03/055297 A1 | 7/2003 | ............ | A01J 5/017 |
| WO | WO 2005/015985 A2 | 2/2005 | | |
| WO | WO 2006/038840 A1 | 4/2006 | ............ | A01K 1/12 |
| WO | WO 2007/050012 A1 | 5/2007 | ............ | A01J 5/017 |
| WO | WO 2008/030086 A1 | 3/2008 | ............ | A01J 5/017 |
| WO | WO 2008/030116 A1 | 3/2008 | ............ | A01K 1/12 |
| WO | WO 2008/058723 A1 | 5/2008 | ............ | A01J 7/02 |
| WO | WO 2008/118068 A1 | 10/2008 | ............ | A01K 1/12 |
| WO | WO 2009/093965 A1 | 7/2009 | ............ | A01J 5/017 |
| WO | WO 2010/012625 A2 | 2/2010 | ............ | A01J 5/017 |
| WO | WO 2010/014002 A9 | 2/2010 | ............ | A01K 1/12 |
| WO | WO 2010/046669 A1 | 4/2010 | ............ | A01J 5/017 |
| WO | WO 2010/110663 A1 | 9/2010 | ............ | A01J 5/017 |
| WO | WO 2010/119079 A2 | 10/2010 | ............ | A01K 1/12 |
| WO | WO 2011/032901 A2 | 3/2011 | ............ | A01J 5/017 |
| WO | WO 2011/098454 A1 | 8/2011 | ............ | A01K 1/12 |
| WO | WO 2011/098994 A2 | 8/2011 | ............ | A01J 5/017 |
| WO | WO 2011/102717 A1 | 8/2011 | ............ | A01K 1/12 |
| WO | WO 2011/117386 A2 | 9/2011 | ............ | A01J 5/00 |

OTHER PUBLICATIONS

U.S. Appl. No. 13/095,983, filed Apr. 28, 2011, Henk Hofman.
U.S. Appl. No. 13/095,994, filed Apr. 28, 2011, Henk Hofman.

(56) References Cited

OTHER PUBLICATIONS

U.S. Appl. No. 13/448,751, filed Apr. 17, 2012, Henk Hofman.
U.S. Appl. No. 13/448,799, filed Apr. 17, 2012, Henk Hofman.
U.S. Appl. No. 13/448,873, filed Apr. 17, 2012, Henk Hofman.
U.S. Appl. No. 13/448,882, filed Apr. 17, 2012, Henk Hofman.
U.S. Appl. No. 13/448,897, filed Apr. 17, 2012, Henk Hofman.
U.S. Appl. No. 13/448,913, filed Apr. 17, 2012, Henk Hofman.
U.S. Appl. No. 13/448,929, filed Apr. 17, 2012, Henk Hofman.
U.S. Appl. No. 13/448,951, filed Apr. 17, 2012, Henk Hofman.
U.S. Appl. No. 13/448,993, filed Apr. 17, 2012, Henk Hofman.
U.S. Appl. No. 13/449,002, filed Apr. 17, 2012, Henk Hofman.
U.S. Appl. No. 13/449,056, filed Apr. 17, 2012, Henk Hofman.
U.S. Appl. No. 13/449,105, filed Apr. 17, 2012, Henk Hofman.
U.S. Appl. No. 13/449,142, filed Apr. 17, 2012, Henk Hofman.
U.S. Appl. No. 13/449,162, filed Apr. 17, 2012, Henk Hofman.
U.S. Appl. No. 13/449,173, filed Apr. 17, 2012, Henk Hofman.
U.S. Appl. No. 13/449,951, filed Apr. 18, 2012, Henk Hofman.
U.S. Appl. No. 13/451,248, filed Apr. 19, 2012, Henk Hofman.
U.S. Appl. No. 13/454,281, filed Apr. 24, 2012, Henk Hofman.
U.S. Appl. No. 13/454,298, filed Apr. 24, 2012, Henk Hofman.
U.S. Appl. No. 13/454,351, filed Apr. 24, 2012, Henk Hofman.
U.S. Appl. No. 13/454,386, filed Apr. 24, 2012, Henk Hofman.
U.S. Appl. No. 13/454,490, filed Apr. 24, 2012, Henk Hofman.
U.S. Appl. No. 13/454,670, filed Apr. 24, 2012, Henk Hofman.
U.S. Appl. No. 13/454,716, filed Apr. 24, 2012, Henk Hofman.
U.S. Appl. No. 13/454,833, filed Apr. 24, 2012, Henk Hofman.
U.S. Appl. No. 13/454,876, filed Apr. 24, 2012, Henk Hofman.
U.S. Appl. No. 13/454,913, filed Apr. 24, 2012, Henk Hofman.
U.S. Appl. No. 13/454,953, filed Apr. 24, 2012, Henk Hofman.
U.S. Appl. No. 13/454,975, filed Apr. 24, 2012, Henk Hofman.
Jan W. Weingarten, et al.; *A State-of-the-Art 3D Sensor for Robot Navigation*; 6 pages, Sep. 2004.
PCT International Patent Application No. PCT/NL2010/050154 entitled *Robot and Method for Milking a Cow by this Robot*; 19 pages, Mar. 25, 2010.
PCT Notification of Transmittal of the International Search Report and the Written Opinion of the International Searching Authority for Application No. PCT/US2011/047510; 9 pages, Jan. 2, 2012.
PCT Notification of Transmittal of the International Search Report and the Written Opinion of the International Searching Authority for Application No. PCT/US2011/047511; 9 pages, Jan. 2, 2012.
PCT Invitation to Pay Additional Fees and, Where Applicable, Protest Fee and Partial National Search Report for Application No. PCT/US2012/035074; 7 pages, Jul. 16, 2012.
PCT Notification of Transmittal of the International Search Report and the Written Opinion of the International Searching Authority for Application No. PCT/US2012/033894; 11 pages, Jul. 23, 2012.
PCT Invitation to Pay Additional Fees and, Where Applicable, Protest Fee and Partial National Search Report for Application No. PCT/US2012/035079; 8 pages, Jul. 31, 2012.
PCT Notification of Transmittal of the International Search Report and the Written Opinion of the International Searching Authority for Application No. PCT/US2012/033892; 13 pages, Jul. 31, 2012.
PCT Notification of Transmittal of the International Search Report and the Written Opinion of the International Searching Authority for .Application No. PCT/US2012/035356; 14 pages, Jul. 31, 2012.
PCT Invitation to Pay Additional Fees and, Where Applicable, Protest Fee and Partial National Search Report for Application No. PCT/US2012/035107; 7 pages, Jul. 31, 2012.
Canadian Intellectual Property Office; Office Action for Application No. 2,775,132; 3 pages, Aug. 20, 2012.
Canadian Intellectual Property Office; Office Action for Application No. 2,775,130; 2 pages, Aug. 20, 2012.
Canadian Intellectual Property Office; Office Action for Application No. 2,775,169; 3 pages, Aug. 20, 2012.
Canadian Intellectual Property Office; Office Action for Application No. 2,775,177; 2 pages, Aug. 20, 2012.
Canadian Intellectual Property Office; Office Action for Application No. 2,775,252; 3 pages, Aug. 21, 2012.
Canadian Intellectual Property Office; Office Action for Application No. 2,783,887; 2 pages, Oct. 1, 2012.
Canadian Intellectual Property Office; Office Action for Application No. 2,784,070; 3 pages, Oct. 1, 2012.
PCT Notification of Transmittal of the International Search Report and the Written Opinion of the International Searching Authority for International Application No. PCT/US2012/035107; 28 pages, Oct. 16, 2012.
PCT Notification of Transmittal of the International Search Report and the Written Opinion of the International Searching Authority for Application No. PCT/US2012/035077; 25 pages, Dec. 12, 2012.
Canadian Office Action for Application No. 2,775,395, 2 pages, Jan. 14, 2014.
Canadian Intellectual Property Office; Office Action for Application No. 2,775,130; 4 pages, Nov. 27, 2012.
Canadian Intellectual Property Office; Office Action for Application No. 2,775,177; 3 pages, Nov. 27, 2012.

\* cited by examiner

SYSTEM AND METHOD FOR FILTERING DATA CAPTURED BY A 3D CAMERA

RELATED APPLICATION

This application is a continuation of U.S. patent application Ser. No. 14/695,279 filed Apr. 24, 2015 entitled "System and Method for Filtering Data Captured by a 3D Camera," which is a continuation of U.S. patent application Ser. No. 13/448,840 filed Apr. 17, 2012 entitled "System and Method for Filtering Data Captured by a 3D Camera," now U.S. Pat. No. 9,058,657 issued Jun. 16, 2015 which is a continuation-in-part application of U.S. patent application Ser. No. 13/095,994 entitled "Vision System for Robotic Attacher," filed Apr. 28, 2011, now U.S. Pat. No. 8,671,885 issued Mar. 18, 2014.

TECHNICAL FIELD OF THE INVENTION

This invention relates generally to dairy farming and more particularly to a system and method for filtering data captured by a three-dimensional camera.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In an exemplary embodiment, a system includes a three-dimensional camera and a processor. The processor is operable to access a first portion of visual data captured by the three-dimensional camera wherein the visual data comprises an image of a dairy livestock and access a second portion of the visual data, wherein the first portion and the second portion are aligned in a first dimension. The processor is further operable to determine a first coordinate, wherein the first coordinate comprises a location of the first portion in a second dimension, the second dimension orthogonal to the first dimension and determine a second coordinate, wherein the second coordinate comprises a location of the second portion in the second dimension. The processor is further operable to determine a first distance exceeds a distance threshold, wherein the first distance is the distance between the first coordinate and the second coordinate in the second dimension.

Particular embodiments of the present disclosure may provide one or more technical advantages. For example, in some embodiments, the system of the present disclosure includes multiple cameras to facilitate locating the teats of a dairy livestock. Using multiple cameras may improve the visibility of the teats and may facilitate attaching milking equipment from a position to the rear of the dairy livestock, rather than to the side of the dairy livestock as in certain conventional systems. Approaching from the rear of the dairy livestock makes it less likely that the livestock will be distracted by the milking equipment. Furthermore, approaching from the rear of the dairy livestock makes it less likely that the dairy livestock will kick the milking equipment, the vision system, or any other component of the system of the present disclosure.

As another example, in some embodiments, the system of the present disclosure, in searching for the teats of a dairy livestock, may account for (1) a determined reference point relative to the dairy livestock, and/or (2) historical data describing a previous location of the teats relative to the reference point. Accounting for the determined reference point and/or the historical data in searching for the teats of a dairy livestock may allow for more accurate teat location, which may allow a robotic attacher to more efficiently attach milking equipment to the dairy livestock. In certain embodiments, the system of the present disclosure may filter visual data to more efficiently and accurately determine reference points and locations of the teats of a dairy livestock. In some embodiments, the system of the present disclosure may release milking equipment, such as a milking cup, in such a manner as to prevent the accidental detachment of the milking equipment and to ensure that the milking equipment is securely attached to the dairy livestock.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1A:
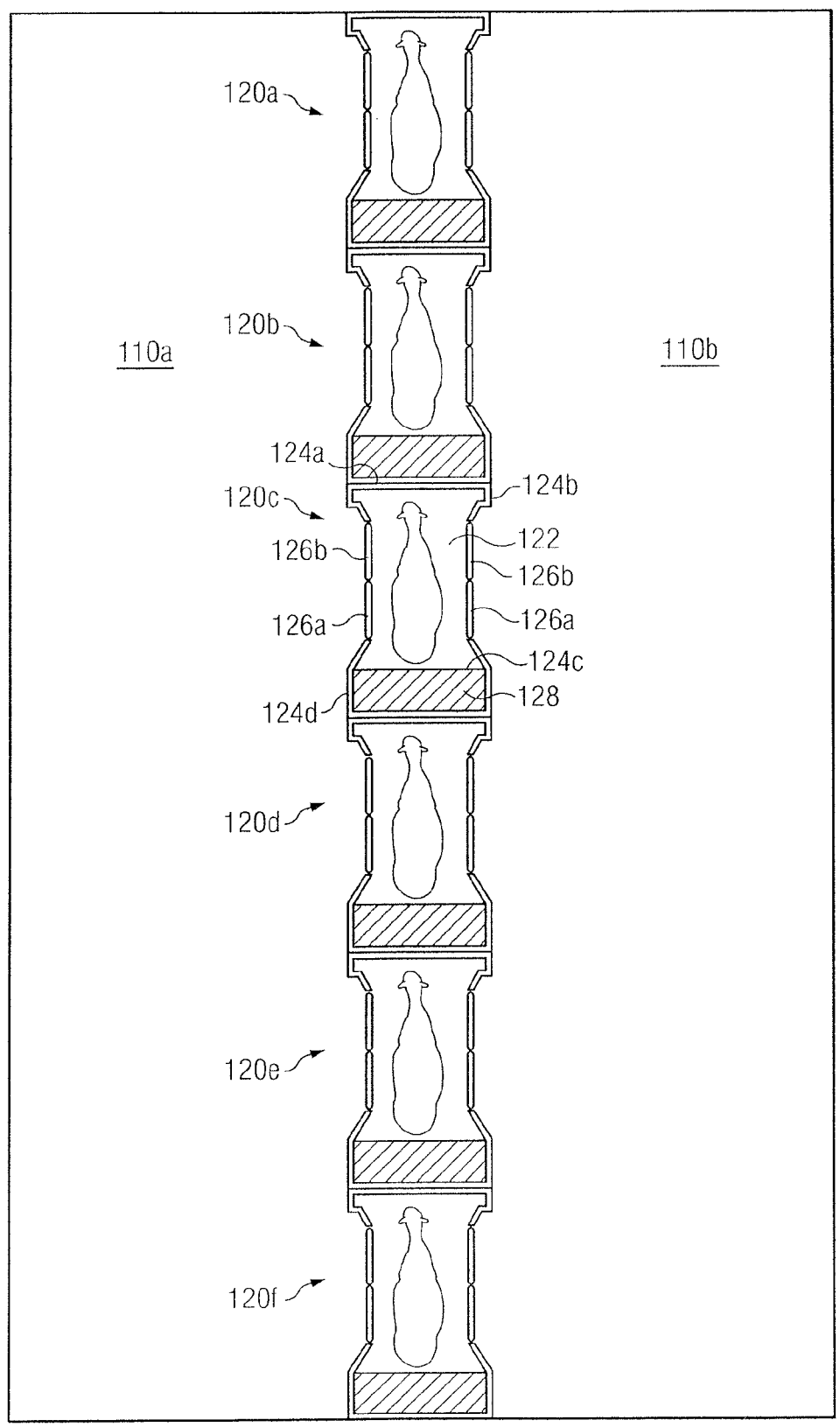
FIGS. 1A-1B illustrate example configurations of an enclosure 100 in which one or more milking boxes are installed, according to certain embodiments of the present disclosure.
Figure 1B:
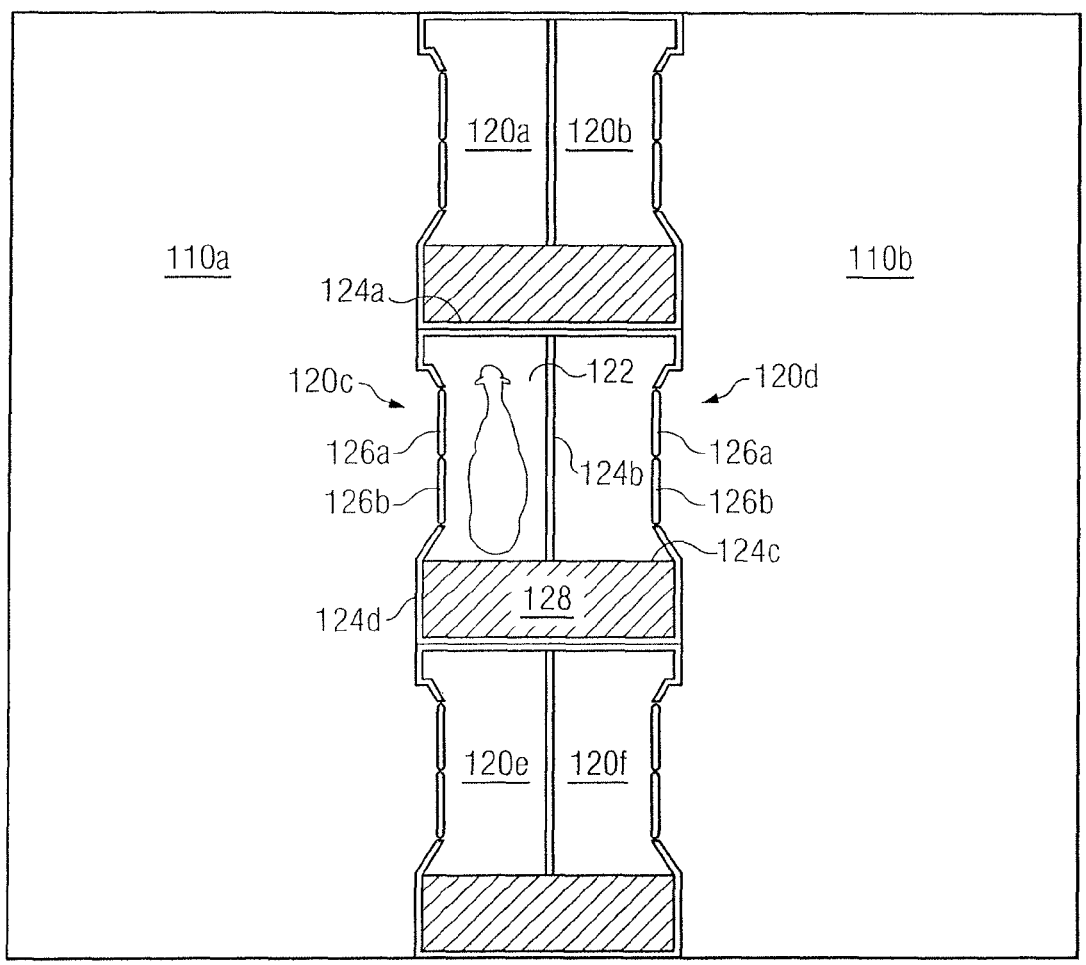

FIGS. 1A-1B illustrate example configurations of an enclosure 100 in which one or more milking boxes 120 are installed, according to certain embodiments of the present disclosure. Generally, enclosure 100 allows for the milking of dairy livestock. At least a portion of the milking process may be essentially automated. The automation of the milking process is facilitated by the presence of a vision system (e.g., vision system 158 of FIG. 3, discussed further below) within or near enclosure 100. Using a vision system, various physical attributes of the dairy livestock can be detected in real-time (or substantially real-time), which may then be used to perform a particular portion of the milking process (e.g., attaching milking cups to the dairy livestock, disinfecting the dairy livestock, etc.).

In particular, enclosure 100 may be divided into a number of regions 110 (e.g., regions 110a and 110b), and each region 110 may include resting stalls, feeding troughs, walking paths, and/or other structure suitable for housing dairy livestock. Although the present disclosure contemplates enclosure 100 as housing any suitable dairy livestock (e.g., dairy cows, goats, sheep, water buffalo, etc.), the remainder of this description is detailed with respect to dairy cows.

Each milking box 120 may include a stall portion 122 configured to house a dairy cow being milked. The stall portion 122 of each milking box 120 may be defined by a number of walls 124, each of which may each be constructed from any suitable materials arranged in any suitable configuration operable to maintain a dairy cow within stall portion 122 during milking. In certain embodiments, stall portion 122 of milking box 120 may include walls 124a, 124b, 124c, and 124d. For purposes of illustration, wall 124a may be designated as the front of milking box 120 such that the head of a dairy cow being milked would be facing wall 124a. Wall 124c may be positioned opposite wall 124a and may be designated as the rear of milking box 120. Walls 124b and 124d may each form a side extending between the front and rear of milking box 120. Walls 124a, 124b, 124c, and 124d may be spaced apart a suitable distance to ensure the comfort of the dairy cow within stall portion 122.

Figure 2:
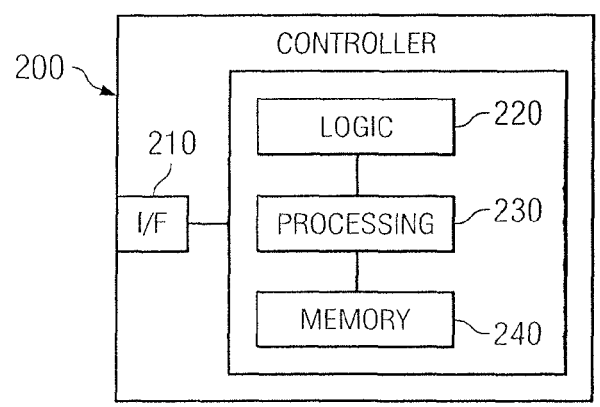
FIG. 2 illustrates an example controller that may be used to control one or more components of the example milking box depicted in FIG. 1, according to certain embodiments of the present disclosure.

Walls 124b and/or 124d may comprise one or more gates 126. In certain embodiments, wall 124b and/or wall 124d may comprise an entry gate 126a and an exit gate 126b. A dairy cow may enter milking box 120 through an opened entry gate 126a and exit milking box 120 through an opened exit gate 126b. Closing gates 126 may maintain the dairy cow within milking box 120 during milking, while opening one or more gates 126 may allow the dairy cow to exit milking box 120. In certain embodiments, gates 126 may each be coupled to a corresponding actuator such that the gates 126 may be automatically opened and/or closed. For example, the actuators corresponding to gates 126 may each be configured to communicate (e.g., via wireless or wireline communication) with a controller 200, depicted in detail in FIG. 2.

Controller 200 may include one or more computer systems at one or more locations. Examples of computer systems may include a personal computer, workstation, network computer, kiosk, wireless data port, personal data assistant (PDA), one or more processors within these or other devices, or any other suitable device for receiving, processing, storing, and communicating data. In short, controller 200 may include any suitable combination of software, firmware, and hardware. Controller 200 may include any appropriate interface 210 for receiving inputs and providing outputs, logic 220, one or more processing modules 230, and memory module 240. Logic 220 includes any information, logic, applications, rules, and/or instructions stored and/or executed by controller 200. Processing modules 230 may each include one or more microprocessors, controllers, or any other suitable computing devices or resources and may work, either alone or with other components, to provide a portion or all of the functionality described herein. Controller 200 may additionally include (or be communicatively coupled to via wireless or wireline communication) one or more memory modules 240. Memory modules 240 may be non-transitory and may each include any memory or database module. Memory modules 240 may take the form of volatile or non-volatile memory, including, without limitation, magnetic media, optical media, random access memory (RAM), read-only memory (ROM), removable media, or any other suitable local or remote memory component.

Returning to FIGS. 1A and 1B, controller 200 may be operable to determine, using any appropriate logic in conjunction with signals received from other components of milking box 120 (e.g., presence sensor 132, gate sensors 134, and/or identification sensor 136, each of which is described with regard to FIG. 3, below), which gates 126 should be open and/or closed. Controller 200 may then communicate signals to the actuators coupled to the determined gates 126, the signals causing the gates 126 to open or close. The automated control of gates 126 using controller 200 is described in further with regard to FIG. 3, below.

Each milking box 120 may additionally include an equipment portion 128 located to the rear of stall portion 122 (i.e., adjacent to rear wall 124c of stall portion 122). Equipment portion 128 may comprise any structure suitable for housing and/or storing a robotic attacher (e.g., robotic attacher 150, described below with regard to FIG. 3), one or more preparation cups, teat cups, receiver jars, separation containers, and/or any other suitable milking equipment. Rear wall 124c (which may include a backplane 138, as described below with regard to FIG. 3) may separate stall portion 122 from equipment portion 128 such that equipment portion 128 is substantially inaccessible to a dairy cow located in stall portion 122. Accordingly a dairy cow located in stall portion 122 may be prevented from accidentally damaging the milking equipment by kicking, biting, trampling, or exposing the milking equipment to dirt, fluids, etc.

In certain embodiments, the equipment portion 128 being located to the rear of stall portion 122 may allow milking boxes 120 to be aligned in a single row such that walls 124b and 124d of each milking box 120 may comprise an entry gate 126a and an exit gate 126b (as illustrated in FIG. 1A). As a result, milking boxes 120 may be used to sort dairy cows into particular regions 110 by controlling the opening/closing of each gate 126 (e.g., in response to signals from a controller 200, as described above). For example, a dairy cow needing a health check or medical attention may be sorted into an appropriate region 110 (e.g., a veterinary pen). As another example, a dairy cow determined to be finished milking for the year and needing to be dried off and bread may be sorted out of the milking heard. As yet another example, a dairy cow may be sorted into one of a number of regions 110 based on the stage of lactation of the dairy cow (as dairy cows in different stages may require different feeds).

In certain other embodiments, the equipment portion 128 being located to the rear of stall portion 122 may allow pairs of milking boxes 120 to be located side by side such that the milking boxes share a wall 124 (e.g., wall 124*b* may be shared between milking box 120*c* and milking box 120*d*, as depicted in FIG. 1B). As a result, a single robotic attacher (e.g., robotic attacher 150, described below with regard to FIG. 3) may be shared by the pair of milking boxes 120, which may reduce to cost of installing multiple milking boxes 120 in the enclosure 100.

Figure 3:
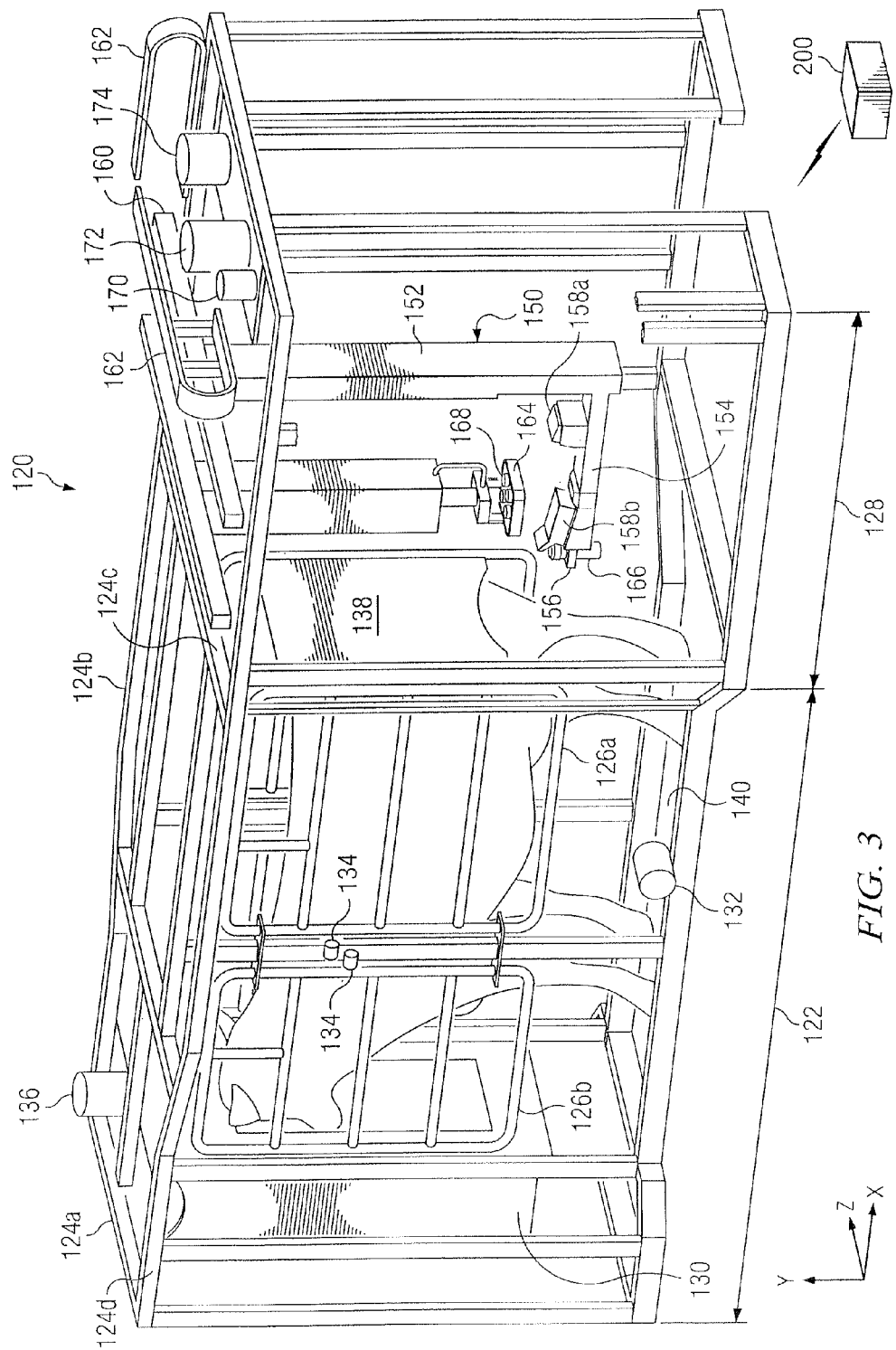
FIG. 3 illustrates a detailed perspective view of the example milking box depicted in FIG. 1, according to certain embodiments of the present disclosure.

FIG. 3 illustrates a detailed perspective view of an example milking box 120, according to certain embodiments of the present disclosure. As described above with regard to FIG. 1, milking box 120 may comprise a stall portion 122 (defined by walls 124 and gates 126) and equipment portion 128 located to the rear of stall portion 122. In certain embodiments, stall portion 122 of milking box 120 may include a feed bowl 130, a presence sensor 132, one or more gate sensors 134, and an identification sensor 136. Additionally, one or more of feed bowl 130, presence sensor 132, gate sensor(s) 134, and identification sensor 136 may be communicatively coupled to controller 200 (described above with regard to FIG. 2).

In certain embodiments, feed bowl 130 may dispense feed in order to attract a dairy cow so that the dairy cow will enter milking box 120 voluntarily. Accordingly, at least one of the entry gates 126*a* may remain open when there is no dairy cow present to allow a dairy cow to enter. Once the dairy cow has entered milking box 120, presence sensor 132 may detect the presence of the dairy cow. For example, presence sensor 132 may detect when the dairy cow has passed through the entrance gate 126*a* and/or when the dairy cow is generally centered in the stall portion 122. Upon detecting the presence of the dairy cow, presence sensor 132 may send a signal to controller 200. In response to the signal, controller 200 may cause one or more actuators to close gates 126. Gate sensor 134 may determine when gates 126 have closed. Gate sensor 134 may communicate a signal to controller 200 upon determining that gates 126 have closed. Controller 200 may initiate a milking procedure in response to the signal.

In certain embodiments, identification sensor 136 may determine the identity of the dairy cow. As an example, identification sensor 136 may comprise an antenna operable to read a radio frequency identification (RFID) from an ear tag, a collar, or other identifier associated with the dairy cow. Once the dairy cow has been identified, the identification sensor 136 may optionally be turned off to prevent wasting power and/or to minimize the dairy cow's exposure to radio waves.

Identification sensor 136 may communicate the identity of the dairy cow to controller 200 to facilitate retrieving information describing the dairy cow (e.g., from memory 240 or any other suitable location). Information describing the dairy cow may comprise historical data 184 describing the particular dairy cow during a previous time period, such as a previous milking cycle. The previous milking cycle may refer to a milking cycle in which milking equipment was manually attached (e.g., by a user) or a milking cycle in which milking equipment was automatically attached (e.g., by a robotic attacher 150, described below). In certain embodiments, milking equipment may be attached manually the first time the dairy cow is milked in order to establish initial information describing the dairy cow, such as where the teats are located. The location of the dairy cow's teats may be described relative to a feature of the dairy cow, such as relative to the rear of the dairy cow, the hind legs, and/or a portion of the dairy cow's udder, such as a mid-line of the udder or relative to one or more of the other teats. A robotic attacher (e.g., robotic attacher 150, described below) may use the information describing the location of the teats during subsequent milkings to facilitate automatically attaching the milking equipment.

Examples of historical data 184 include measurements, statistics, health information, and any other information describing the dairy cow during a previous time period. Examples of measurements include the length of the dairy cow (e.g., from head to tail) and the location of the dairy cow's teats during a previous milking cycle. An example of historical measurements is further discussed in conjunction with FIG. 6, below. Examples of statistics may include statistics describing when the dairy cow was last milked, the amount of milk produced in previous milking cycles, and so on. Examples of health information may include a designation not to milk the dairy cow due to a health problem or a designation to sort the dairy cow into a veterinary pen. In certain embodiments, a user may set an indicator in the database to indicate that the dairy cow should be sorted into the veterinary pen because the dairy cow is due for a check-up or because the user noticed the dairy cow appears to be ill or injured.

Controller 200 may use the information retrieved according to the identity of the dairy cow to determine how the particular dairy cow should be handled. If the information indicates the dairy cow should not be milked, controller 200 may cause an actuator to open one or more of the exit gates 126*b*. For example, if controller 200 determines that the dairy cow should be sorted into a particular region 110 of enclosure 100, such as a veterinary pen, it may cause the exit gate 126*b* that accesses the selected region 110 to open. Alternatively, controller 200 may cause multiple exit gates 126*b* to open if the dairy cow is to be given the option of which region 110 to occupy upon exiting milking box 120. In certain embodiments, a prod may be used to encourage the dairy cow to exit. Examples of prods include a noise, a mechanical device, or a mild electric shock.

Upon a determination that the dairy cow should be milked, controller 200 may continue the milking procedure. In certain embodiments, controller 200 may cause a dispenser to drop feed into feed bowl 130. Additionally, controller 200 may cause feed bowl 130 to move toward the dairy cow in order to encourage the dairy cow to move to a pre-determined part of stall portion 122. As an example, feed bowl 130 may be initially positioned in the front of stall portion 122 when the dairy cow enters. Feed bowl 130 may then move back toward the dairy cow to encourage the dairy cow to move to the rear of stall portion 122 (e.g., against backplane 138, described below) in order to facilitate attaching the milking equipment to the dairy cow. To ensure feed bowl 130 does not crowd the dairy cow, the amount of movement of feed bowl 130 may be customized to the size of the dairy cow. For example, a user may determine an appropriate location for feed bowl 130 the first time the dairy cow enters milking box 120. The location may be stored (e.g., in memory module 240 of controller 200) such that it may be retrieved during subsequent milkings according to the identity of the dairy cow. Alternatively, the feed bowl 130 may be configured to continue moving toward the rear of the stall portion 122 until the dairy cow contacts backplane 138 (described below), which may indicate that the dairy cow is positioned in a location that is suitable for attaching the milking equipment.

In certain embodiments, rear wall 124*c* of stall portion 122 includes a backplane 138. Backplane 138 may comprise any suitable configuration of materials suitable for locating the rear of the dairy cow in order to facilitate the efficient attachment of the milking equipment. For example, backplane 138 may comprise a tracker operable to track a displacement of the dairy livestock in a certain direction. Backplane 138 may also comprise an encoder communicatively coupled to the tracker and operable to determine the distance traveled by the tracker. In certain embodiments, the dairy cow may be backed toward backplane 138 by moving feed bowl 130 as described above. In certain other embodiments, backplane 138 may be moved forward toward the dairy cow. In certain other embodiments, a combination of backing the dairy cow toward backplane 138 and moving backplane 138 forward toward the dairy cow may be used. It may be determined that the rear of the dairy cow has been located when a portion of backplane 138, such as a pipe or bracket, touches the rear of the dairy cow at any suitable location, such as approximately mid-flank (i.e., between the udder and the tail). Backplane 138 may additionally include a manure gutter for directing manure toward a side of stall portion 122 (e.g., away from the dairy cow's udder and the milking equipment).

In certain embodiments, stall portion 122 may additionally include a waste grate 140 for disposing of waste. Waste grate 140 may have a rough surface to discourage the dairy cow from standing on it. In addition, waste grate 140 may be dimensioned such that when the dairy cow's hind legs are positioned on opposite sides of waste grate 140, the hind legs are separated to facilitate attachment of the milking equipment to the dairy cow's teats.

In certain embodiments, equipment portion 128 of milking box 120 may include a robotic attacher 150, one or more preparation cups 166, teat cups 168, pumps 170, receiver jars 172, milk separation containers 174, and/or any other suitable milking equipment. In certain embodiments, robotic attacher 150 may be suspended into equipment portion 128 from a rail 160. Rail 160 may be generally located above the level of the udder of a dairy cow located in stall portion 122 such that the teats of the dairy cow may be accessible to robotic attacher 150 when suspended from rail 160. For example, rail 160 may extend across the top of equipment portion 128 of milking box 120 and may be oriented substantially parallel to rear wall 124c.

Robotic attacher 150 may be communicatively coupled to controller 200 (e.g., via a network facilitating wireless or wireline communication). Controller 200 may cause robotic attacher to attach certain milking equipment to the dairy cow's teats. For example, in certain embodiments, robotic attacher 150 may access a storage area 164 to retrieve preparation cups 166 and/or teat cups 168. Preparation cups 166 may be adapted to clean the teats, stimulate the flow of milk, and discard fore milk from the teat (e.g., the first few millimeters of milk that may be dirty). Teat cups 168 may be adapted to extract milk from the dairy cow. Preparation cups 166 and/or teat cups 168 attached to extendable hoses may by hung within storage area 164 between milkings to protect the cups from manure and flies. When it is time to milk the dairy cow, robotic attacher 150 may pull preparation cups 166 from storage area 164 and attach them to the dairy cow one at a time, two at a time, or four at a time. After the teats have been prepared, preparation cups 166 may be removed and teat cups 168 may be attached one at a time, two at a time, or four at a time. Once the cups are attached, robotic attacher 150 may withdraw to prevent the dairy cow from causing accidental damage to the equipment, and the system may proceed with milking the dairy cow.

During milking, pump 170 may pump good milk from teat cup 168 to receiver jar 172 to be stored at a cool temperature. Pump 170 may pump bad milk to milk separation container 174 to be discarded. Milk may be determined to be bad based on testing the milk and/or based on the particular dairy cow from which the milk has been extracted. For example, information retrieved from a database according to the dairy cow's identifier may indicate that the milk should be discarded because the dairy cow is ill or has recently calved. Pump 170, jar 172, and separation container 174 may be placed at any suitable location as appropriate.

In certain embodiments, robotic attacher 150 comprises a main arm 152, a supplemental arm 154, a gripping portion 156, and a vision system 158. In certain embodiments, the movement of main arm 152, supplemental arm 154, and gripping portion 156 may be varied in response to signals received from controller 200 (as described in further detail in FIG. 4A below). Although the components of robotic attacher 150 are depicted and primarily described as oriented in a particular manner, the present disclosure contemplates the components having any suitable orientation, according to particular needs.

In order to obtain access to the dairy cow's teats, main arm 152, supplemental arm 154, and gripping portion 156 may work together to facilitate movement in three dimensions, for example, according to an x-axis, a y-axis, and a z-axis. As illustrated, the x-axis extends in the direction of the dairy cow's length (e.g., from head-to-tail), the y-axis extends in the direction of the dairy cow's height, and the z-axis extends in the direction of the dairy cow's width. However, any suitable orientation of x, y, and z axes may be used as appropriate.

Main arm 152 may comprise a vertical arm movably coupled to rail 160. For example, a hydraulic cylinder may movably couple main arm 152 to rail 160. Main arm 152 may traverse rail 160 to facilitate movement of robotic attacher 150 along the z-axis. Accordingly, rail 160 may comprise a track and rollers adapted to support the weight of robotic attacher 150 and to facilitate movement of main arm 152 back-and-forth along rail 160. To prevent wires and hoses from interfering with the movement of main arm 152 along rail 160, guides 162 may be used to loosely hold the wires and hoses in place. For example, guides 162 may comprise U-shaped brackets that allow the wires and hoses to extend a sufficient amount to accommodate movements of main arm 152, but prevent the wires and hoses from dangling in the path of main arm 152.

Main arm 152 attaches to supplemental arm 154. Supplemental arm 154 facilitates movements in any direction. That is, supplemental arm 154 moves in-and-out along the x-axis, up-and-down along the y-axis, and/or from side-to-side along the z-axis. Accordingly, supplemental arm may extend between the rear legs of the dairy cow located within stall portion 122 in order to attach milking equipment to the dairy cow. Supplemental arm 154 may comprise gripping portion 156. Gripping portion 156 may grip a preparation cup 166 or a teat cup 168 for attachment to the dairy cow's teat. Gripping portion 156 may comprise a wrist adapted to perform fine movements, such as pivot and tilt movements, to navigate around the dairy cow's legs and to access the dairy cow's teats. To determine the location of the dairy cow's legs and teats, robotic attacher 150 may use vision system 158. An example embodiment of vision system 158 is described with respect to FIGS. 4A and 4B below.

Example attachment operation of robotic attacher 150 will now be discussed. Gripping portion 156 may grip teat cup 168 and teat cup 168 may be moved towards a teat of a dairy livestock. For example, teat cup 168 may be moved to a particular set of coordinates provided by controller 200. In certain embodiments, teat cup 168 may be positioned under a teat of the dairy livestock. Once teat cup 168 is in proper position under a teat of the dairy livestock, teat cup 168 may be moved towards a particular teat. For example, supplemental arm 154 may be instructed by controller 200 to maneuver in an upward direction towards a particular teat. In certain embodiments, controller 200 may determine whether teat cup 168 is within a particular threshold as teat cup 168 approaches the teat. If teat cup 168 is not within a particular threshold, supplemental arm 154 may continue to position teat cup 168 closer to the teat. Otherwise, pressure may be applied to teat cup 168. In certain embodiments, this may be vacuum pressure applied to teat cup 168 by a pulsation device. By applying vacuum pressure to teat cup 168, teat cup 168 may draw in a particular teat for milking into teat cup 168. Controller 200 may eventually determine whether a particular teat has been drawn into teat cup 168. If so, controller 200 may provide an instruction for gripping portion 156 to release teat cup 168. Controller 200 may then instruct supplemental arm 154 to move gripping portion 156 upwards and away at a particular angle from the teat of the dairy livestock. By instructing gripping portion 156 to move up and away from the particular teat of the dairy livestock at a particular angle, the possibility of gripping portion 156 to detach teat cup 168 accidentally is decreased. Controller 200 may then determine whether another teat cup 168 may be attached. If another teat cup 168 may be attached, then the attachment operation may be repeated.

Figure 4A:
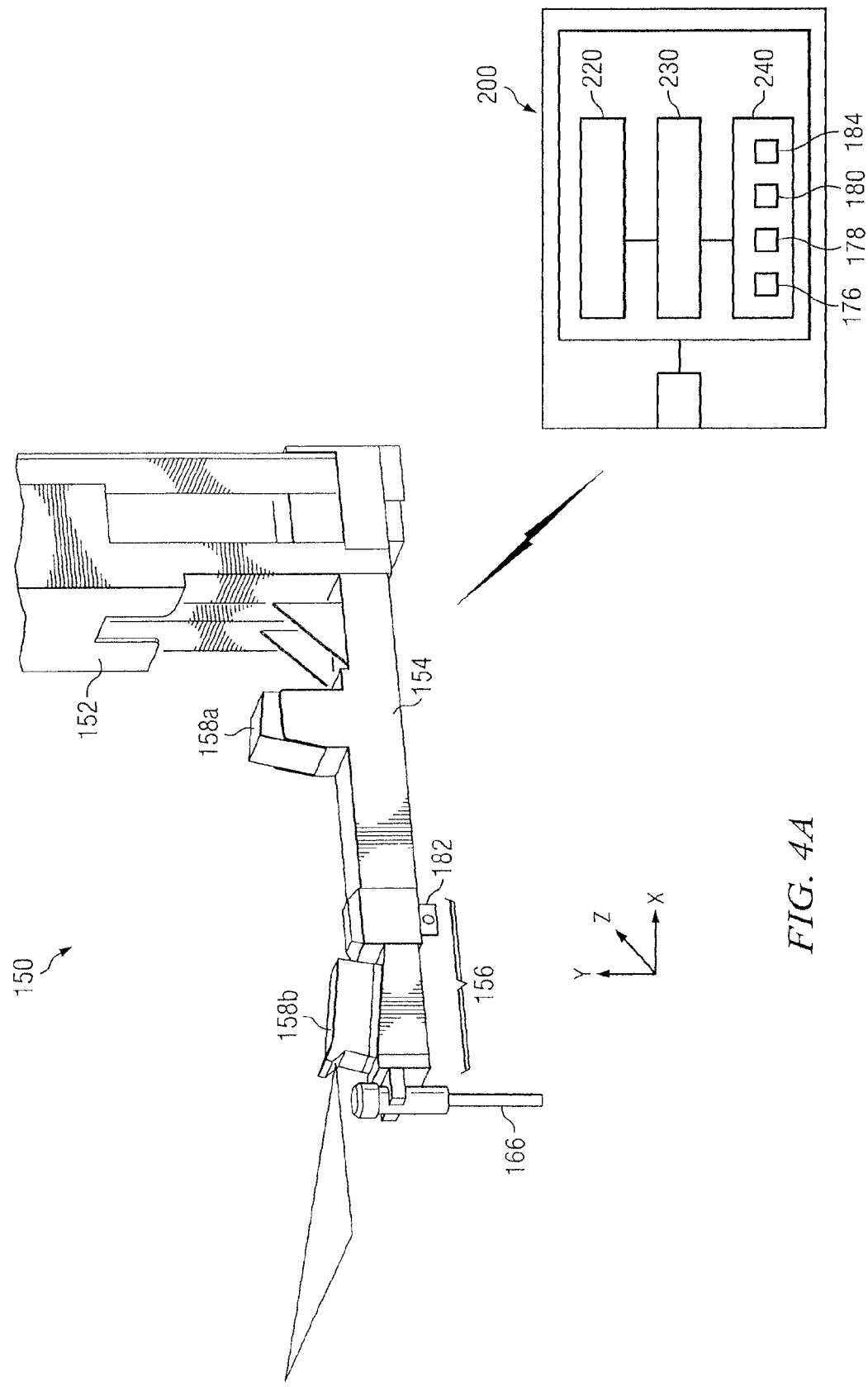
FIG. 4A illustrates a detailed perspective view of the example robotic attacher depicted in FIG. 3, according to certain embodiments of the present disclosure.

FIG. 4A illustrates a detailed perspective view of an example of robotic attacher 150, according to certain embodiments of the present disclosure. Robotic attacher 150 may include a main arm 152, a supplemental arm 154, a gripping portion 156, and a vision system 158. As described with respect to FIG. 3, robotic attacher 150 may be communicatively coupled to controller 200. Controller 200 may cause robotic attacher to retrieve a cup, such as preparation cup 166 or teat cup 168, move the cup toward a teat of a dairy cow within milking box 120, and attach the cup to the teat.

In general, the teats of the dairy cow may be relatively less visible when looking at the dairy cow from the rear and relatively more visible when looking at the dairy cow from the side. Vision system 158 may facilitate locating the teats from a position to the rear of the dairy cow. Vision system 158 may include multiple cameras, such as a first camera 158*a* and a second camera 158*b*. In certain embodiments, cameras 158*a*, 158*b* may be coupled to robotic attacher 150 and may be positioned at any suitable location along main arm 152 or supplemental arm 154. As an example, second camera 158*b* may be coupled to gripping portion 156 of supplemental arm 154 at a location proximate to the part of gripping portion 156 adapted to hold a teat cup, and first camera 158*a* may be coupled to supplemental arm 154 at a location between second camera 158*b* and main arm 152.

Generally, vision system 158 may perform at least two operations: locating reference point 178 of the udder of the dairy cow and determining the positions of the teats of the dairy cow. First camera 158*a* may be used to determine the reference point of the udder of the dairy cow. Reference point 178 may be a point near the udder of the dairy cow where robotic attacher 150 may move to, or near, in order to perform a particular function. In certain embodiments, first camera 158*a* may comprise a three-dimensional camera adapted to generate a first image 176 depicting the rear of the dairy cow, including the hind legs and the udder. Using a three-dimensional camera may facilitate generating a relatively complete image of the rear of the dairy cow within approximately a couple of seconds (e.g., one second), which may be faster than the amount of time it would take for a two-dimensional camera to generate a similar image.

To facilitate the determination of reference point 178, controller 200 may detect the location of the hips, hind legs, and the udder by analyzing first image 176. To do this, controller 200 may find the edges of the dairy livestock. Controller 200 may find the edges of the diary livestock by comparing the depth information of pixels in an image. Once the edges of the dairy livestock are found, using this information, controller 200 may determine reference point 178 near the udder. At any point, controller 200 may determine that erroneous visual data (e.g., a fly in front of first camera 158*a*) has been captured in first image 176. In such instances, controller 200 may filter out such erroneous data.

After determining reference point 178, vision system 158 may be used to determine the locations of the teats of the diary cow. For example, controller 200 may instruct robotic attacher 150 to maneuver near reference point 178 to start determining the location of teats of the dairy cow. Controller 200 may determine the location of the teats of the dairy cow by utilizing second camera 158*b*. In certain embodiments, second camera 158*b* may comprise lens 264 and transmitter 260 (e.g., a laser-emitting device) adapted to generate a second image 180 depicting at least a portion of the udder to facilitate locating the teats. Second camera 158*b* may facilitate locating the end of each teat with a relatively high degree of accuracy, such as within a few millimeters. The location of the teat may be used to instruct robotic attacher 150 where to attach the milking equipment. In determining the location of a teat, controller 200 may encounter erroneous visual data captured by second camera 158*b*. In such instances, controller 200 may filter out the erroneous data.

In certain embodiments, robotic attacher 150 may further comprise a nozzle 182. Nozzle 182 may be coupled to gripping portion 156. Nozzle 182 may spray disinfectant on the teats of the dairy cow at the end of a milking cycle, that is, after the dairy cow has been milked and the teat cups have been removed. The disinfectant may be sprayed to prevent mastitis or other inflammation or infection. In certain embodiments, gripping portion may be operable to rotate 180° around the x-axis. During milking, second camera 158*b* may be generally oriented on top of gripping portion 156, and nozzle 182 may be generally oriented underneath gripping portion 156 (i.e., opposite second camera 158*b*). Orienting nozzle 182 underneath gripping portion 156 during milking may prevent milk or other contaminants from accessing nozzle 182. Once the milking has been completed, gripping portion 156 may rotate such that nozzle 182 may be generally oriented on top of gripping portion 156, and second camera 158*b* may be generally oriented underneath gripping portion 156. Orienting nozzle 182 on top of gripping portion 156 after milking may facilitate spraying the teats with disinfectant from nozzle 182.

The operation of vision system 158 will now be discussed in more detail. In operation, generally, controller 200 may access a first image 176 generated by first camera 158*a* (e.g., from memory module 240) and use first image 176 to determine, using any suitable logic 220, a reference point 178 proximate to the udder, which may then be stored (e.g., in memory module 240). Reference point 178 may be defined relative to certain features of the dairy cow, such as the hind legs and/or the udder. In certain embodiments, reference point 178 point may be center location 712 of FIG. 7, discussed below.

To determine reference point 178, first camera 158*a* may begin by generating the first image 176 in response to a signal from controller 200 indicating that the dairy cow is positioned proximate to the milking equipment. As an example, the signal may indicate that the rear of the dairy cow has been detected by the backplane 138 of the milking box 120. In certain embodiments, controller 200 may communicate the signal to first camera 158*a* after determining the dairy livestock has settled down. For example, controller 200 may communicate the signal after feed is dropped into feed bowl 130. As another example, controller 200 may communicate the signal to first camera 158*a* after identification sensor 136 communicates the identity of the dairy cow to controller 200 and controller 200 determines that the dairy cow may be milked. As a further example, there may be a time buffer after a particular event before controller 200 communicates the signal to first camera 158*a*. The time buffer may be after the dairy cow enters milking box 120, after the feed is dropped into feed bowl 130, after the rear of the dairy cow has been detected by backplane 138, after the identification sensor 136 communicates the identity of the dairy cow, or any other suitable event.

First camera 158*a* may begin generating the first image 176 from a starting point and may update the first image 176 in real-time as robotic attacher 150 approaches the dairy cow. The starting point may be determined according to a default position of robotic attacher 150 (e.g., a position determined relative to milking stall 122). Thus, the starting point may be determined without the use of historical data 184 associated with the particular dairy cow being milked. First camera 158*a* may then generate first image 176, capturing visual data generally depicting the rear of the dairy cow. First camera 158*a* may communicate the first image 176 to controller 200, and controller 200 may use the image to locate main features of the dairy cow, such as the right hind leg, the left hind leg, the udder, and/or the tail.

More specifically, controller 200 may use first image 176 to determine reference point 178 based on the location of the main features of the dairy cow. Reference point 178 may be defined relative to certain features of the dairy cow, such as the hind legs and/or the udder. As an example, reference point 178 may be defined between the hind legs and/or below the udder. In certain embodiments, the reference point 178 may be located proximate to a mid-point of the udder. The mid-point of the udder may refer to a point generally located between the front teats and the rear teats in the x-direction and/or between the left teats and the right teats in the z-direction. In certain embodiments, the mid-point of the udder may be estimated prior to determining the precise location of the teats, for example, according to the general size and location of the udder. Reference point 178 may be spaced apart from the dairy cow in the y-direction to minimize the likelihood that second camera 158*b* touches the dairy cow. For example, reference point 178 may be located a few inches below the mid-point of the udder. In certain embodiments, reference point 178 may be center location 712, discussed further below.

The operation of determining reference point 178 will now be discussed in more detail. Generally, controller 200 may begin to find reference point 178 by analyzing first image 176 to find particular edges of the rear of the dairy cow such as edges 702 of FIG. 7. To do this, controller 200 may find hip locations 704, outer hind locations 706, inner hind locations 708, and udder edges 710 of FIG. 7. Controller 200 may find these various locations by comparing depth information of visual data and determine which portions of the visual data represent the dairy cow and which portions do not. In making these determinations, at any point, controller 200 may filter out particular data that may lead to an inaccurate analysis.

Figure 4B:
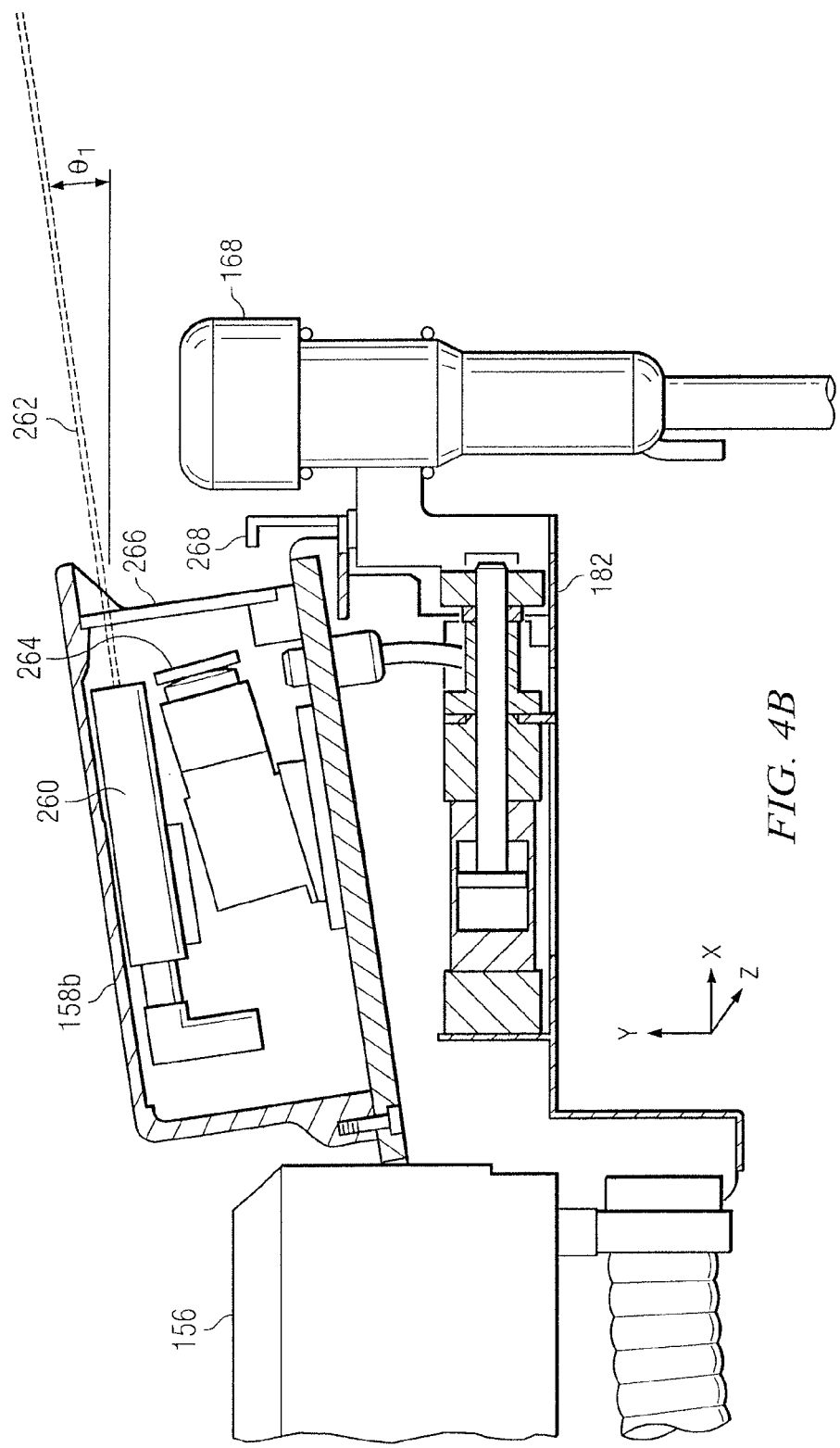
FIG. 4B illustrate an example of a side plan view of the example camera depicted in FIG. 3 according to certain embodiments of the present disclosure.
Figure 7:
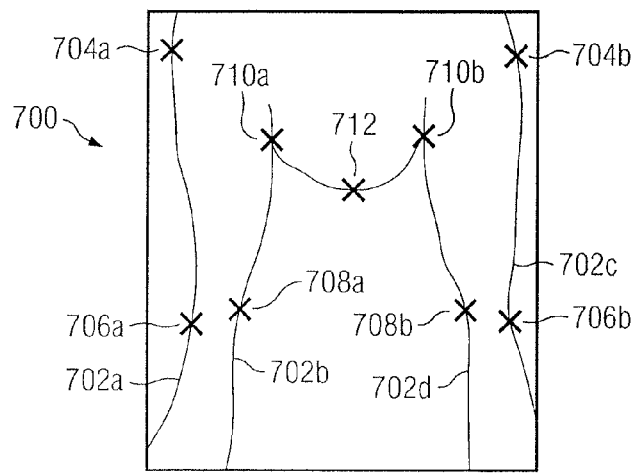
FIG. 7 illustrates an example snapshot identifying various portions of a dairy livestock.

In particular, controller 200 may begin to determine reference point 178 by locating hip location 704*a* of FIG. 7. Controller 200 may do this by comparing the depth locations of pixels of an upper outer area of first image 176, or any other area of first image 176 likely to include the hip of the dairy cow. For example, controller 200 may access first image 176 generated by first camera 158*a*. Controller 200 may compare the pixels of first image 176 by determining the depth of the pixels. The depth of the pixels may be a distance in the x-dimension (as illustrated in FIGS. 3, 4A, and 4B), between first camera 158*a* and a particular object. In certain embodiments, the depth may be determined by measuring the time of flight of a light signal between first camera 158*a* and a particular object captured in first image 176 in the x-dimension.

By comparing the depth locations of various pixels to each other, controller 200 may attempt to locate particular edges of the dairy livestock. For example, controller 200 may compare the depth information of a group of pixels to determine if a portion of the pixels are closer than other portions of pixels. A cluster of pixels closer to first camera 158*a* may signify that an edge of a dairy livestock has been found. The cluster of pixels with depth information further away from camera 158*a* may signify that the image data is of an object other than an edge of the dairy livestock. Controller 200 may associate this location of the cluster of pixels that are closer to first camera 158*a* with an edge of the dairy livestock. For example, controller 200 may have determined that the cluster of pixels represents a first edge corresponding to the hip of the dairy livestock. In certain embodiments, this location may correspond with hip location 704*a* of FIG. 7. Controller 200 may store the association between the determined location and hip location 704*a* in memory 240 or in any other suitable component of controller 200.

After finding the hip of the dairy livestock, controller 200 may attempt to locate the hind leg of the dairy livestock. Generally, controller 200 may begin to locate the hind leg of the dairy livestock by analyzing visual data in a downward direction from hip location 704*a* in an attempt to determine outer hind location 706*a* of FIG. 7. To do this, controller 200 may compare the depth information of pixels in a lower outer area of first image 176, or any other area of first image 176 likely to include visual data of the hind leg of the dairy livestock.

For example, controller 200 may traverse pixels of first image 176 in a downward direction in order to locate the outer edge of a hind leg of the dairy livestock. In certain embodiments, controller 200 may traverse pixels of first image 176 in a downward direction from hip location 704*a* to determine outer hind location 706*a* of FIG. 7. At any point, controller 200 may filter data as discussed further below. Controller 200 may determine whether some pixels are closer, to first camera 158*a*, than other pixels signifying an edge of a hind leg has been found. Controller 200 may associate the location of the cluster of pixels that are closer to first camera 158*a* with an edge of the dairy livestock. For example, controller 200 may have determined that the cluster of pixels represents an edge corresponding to an outer edge of a hind leg of the dairy livestock. In certain embodiments, this location may correspond with outer edge location 706*a* of FIG. 7. Controller 200 may store the association between the determined location and outer edge location 706*a* in memory 240 or in any other suitable component of controller 200.

Controller 200 may then search for an inner edge of the hind leg of the dairy livestock. For example, controller 200 may attempt to determine inner hind leg location 708*a* of FIG. 7. To do this, controller 200 may begin to scan the depth information of pixels along a lower inner area of first image 176, or any other portion of first image 176 likely to include visual data of the inner hind leg of the dairy livestock.

For example, controller 200 may traverse pixels along the z-dimension (as illustrated in FIGS. 3, 4A, and 4B) from outer edge location 706*a* to the center of first image 176 trying to locate an inner edge of the hind leg of the dairy livestock. According to some embodiments, controller 200 may filter image data as described further below. Controller 200 may determine whether some pixels are closer than other pixels signifying an inner edge of the hind leg has been found. Controller 200 may associate the location of the cluster of pixels that are closer to first camera 158*a* with an edge of the dairy livestock. For example, controller 200 may have determined that the cluster of pixels represents an edge corresponding to an inner edge of a hind leg of the dairy livestock. In certain embodiments, this location may correspond with inner edge location 708*a* of FIG. 7. Controller 200 may store the association between the determined location and inner edge location 708*a* in memory 240 or in any other suitable component of controller 200.

After locating the inner edge of the hind leg, controller 200 may search for the location of the udder of the dairy livestock. Controller 200 may begin to scan the depth information of pixels along an upper area of first image 176, or any other portion of first image 176 likely to include the udder of the dairy livestock. For example, controller 200 may scan pixels along a vertical dimension above the location of the inner edge (e.g., inner edge location 708*a* of FIG. 7), trying to locate an edge of the udder of the dairy livestock. In certain embodiments, this edge may be where the udder of the livestock meets an inner edge of a hind leg of the dairy livestock. According to some embodiments, controller 200 may filter visual data as discussed further below.

Controller 200 may determine whether some pixels are closer than other pixels signifying an edge of the dairy livestock has been found. For example, controller 200 may compare the depth information of a group of pixels to determine if a portion of the pixels are closer than other portions of pixels. A cluster of pixels closer to first camera 158*a* than other clusters may signify an edge has been found. If the edge is substantially vertical (e.g., edge 702*b* of FIG. 7), then controller 200 may be analyzing an inner edge of the hind leg. Controller 200 may continue traversing first image 178 until the location of the udder is found. This location may be determined where the edges in depth transition from being substantially vertical, indicating the inside of the hind legs, to substantially horizontal, indicating the udder. Once the edges in depth detected by controller 200 transition to being substantially horizontal, controller 200 may then associate the location with an edge of the dairy livestock. For example, controller 200 may have determined that the cluster of pixels represents an edge in depth corresponding to an udder edge of the dairy livestock where the udder meets the hind leg. In certain embodiments, this location may correspond with udder edge location 710*a* of FIG. 7. Controller 200 may store the association between the determined location and udder edge location 710*a* in memory 240 or in any other suitable component of controller 200.

After finding the edges corresponding to a side of the dairy livestock, controller 200 may determine if data points from both sides of the dairy livestock have been collected. In certain embodiments, this determination may be based on whether controller 200 has enough data points to calculate a center location of the udder of the dairy livestock. For example, controller 200 may use at least two locations of the udder to calculate the center of the udder (e.g., center location 712 of FIG. 7), where each location identifies where the udder intersects with each hind leg (e.g., udder edges 710). If controller 200 determines that only a single udder edge 710 has been found, controller 200 may proceed to determine the locations of the other hind leg and the other udder edge 710 of the dairy livestock. For example, controller 200 may determine hip location 704*b*, outer hind location 706*b*, inner hind location 708*b*, and udder edge 710*b* of FIG. 7.

Once controller 200 has found a number of locations of edges of the dairy livestock, controller 200 may calculate a center location of the udder. For example, controller 200 may calculate center location 712 of FIG. 7 based on the acquired locations discussed above. According to some embodiments, center location 712 may correspond to reference point 178. In certain embodiments, the center location may be determined by calculating a coordinate that is approximately equidistant from each determined udder edge. For example, location 712 of FIG. 7 may be calculated by finding the center point between udder edge locations 710*a* and 710*b* of FIG. 7. Controller 200 may also determine the depth location of the center of the udder. In certain embodiments, controller 200 may determine the depth location by analyzing visual data captured by first camera 158*a*. In other embodiments, the depth location of the center of the udder may be calculated by using historical data 184 of the udder's location in relation to another portion of the dairy livestock (e.g., the rear of the dairy livestock) as well as a displacement measurement of the dairy livestock within a particular stall. The displacement measurement may be obtained using backplane 138.

At any point in determining reference point 178, controller 200 may filter particular visual data deemed undesirable. Generally, depth information analyzed from first image 176 should stay fairly constant. This signifies that the same object is being analyzed. However, controller 200 may determine that undesirable visual data has been captured by first camera 158*a* in first image 176. Examples of undesired data captured by first camera 158*a* may be a fly, a livestock's tail, dirt, fog, moisture, a reflection off of a metal post in enclosure 100, or any other object that may interfere with controller 200 analyzing first image 176. Controller 200 may make this determination by determining whether some pixels exceed a distance threshold. For example, controller 200 may determine that one or more pixels are too close to first camera 158*a*. Pixels that are too close to first camera 158*a* may suggest undesired data has been captured by first camera 158*a*. As another example, controller 200 may determine that the measured depths of adjacent pixels are fluctuating, exceeding a certain threshold. As a further example, controller 200 may determine that measured depths of adjacent pixels are changing excessively, exceeding a certain threshold. Any of these examples may signify undesirable visual data.

If controller 200 has determined that some pixels exceed a distance threshold and/or have depth information signifying certain pixels represent undesirable visual data captured by first camera 158*a*, then controller 200 may filter that particular visual data. Thus, controller 200 may determine that a certain set of pixels are too close to or too far from camera 158*a* and may eliminate those pixels from consideration when analyzing first image 176. Or controller 200 may have determined that certain adjacent pixels contained depth information that fluctuated beyond a threshold. As another example, controller 200 may have determined that certain adjacent pixels contained depth information that changed excessively from pixel to pixel. All of these examples may be examples of data potentially filtered by controller 200 when analyzing first image 176.

Once controller 200 has determined reference point 178 (e.g., center location 712 of FIG. 7), controller 200 may facilitate the scanning of teats of the dairy livestock. Controller 200 may begin by facilitating the positioning of robotic attacher 150 such that the teats may be scanned by second camera 158*b*. For example, controller 200 may communicate reference point 178 and/or information describing the main features of the dairy cow to robotic attacher 150. The reference point 178 may be used to position second camera 158*b*. The information describing the main features of the dairy cow may be used to prevent robotic attacher 150 from colliding with the dairy cow when navigating second camera 158*b* toward reference point 178. Information describing the main features of the dairy cow may include the position of the hind legs, the space between the hind legs, the position of the udder, the height of the udder, the position of the tail, and/or other information. Once robotic attacher 150 has positioned second camera 158*b* relative to the reference point 178, second camera 158*b* may begin scanning the udder.

Controller 200 may send a signal to robotic attacher 150 causing robotic attacher 150 to position second camera 158*b* relative to the reference point 178. Accordingly, second camera 158*b* may have a consistent point of reference from one milking cycle to the next, which may allow the teats to be located efficiently. Controller 200 may access a second image 180 generated by second camera 158*b* (e.g., from memory module 240) in order to determine, using any suitable logic 220, a location of a teat.

In certain embodiments, second camera 158*b* may determine where to look for one or more of the teats according to historical data 184. Historical data 184 may be received from controller 200 and may describe a previously-determined location of the teats relative to the reference point 178. The previously-determined location may be based on the location of the teats during one or more previous milking cycles. As an example, the previously-determined location may comprise the location of the teats during the most recent milking cycle. As another example, the previously-determined location may comprise an average of the locations of the teats during a number of previous milking cycles. As another example, the previously-determined location may comprise the location of the teats during a previous milking cycle in which the udder was likely to be as full of milk as the current milking cycle. For example, if eight hours have elapsed since the dairy cow was last milked, the previously-determined location may be determined from a previous milking cycle in which the dairy cow had not been milked for approximately eight hours. Referring to historical data 184 may minimize the area that second camera 158*b* may scan in order to locate the teat and may reduce the amount of time required to locate the teat.

Second camera 158*b* may communicate the second image 180 to controller 200, and controller 200 may access the second image 180 to locate the teats of the dairy cow. As described below in FIG. 4B, in certain embodiments, second camera 158*b* may comprise lens 264 and transmitter 260, such as a horizontal laser-emitting device. If the horizontal laser scans a portion of the udder other than the teats (e.g., a relatively even surface of the udder), the scan communicated to controller 200 may generally resemble a substantially solid line. If the horizontal laser scans a portion of the udder that includes the teats, the scan communicated to controller 200 may generally resemble a broken line depicting the teats and the spaces between the teats. As an example, controller 200 may determine that a teat has been located if the scan comprises a broken line in which a solid portion of the line generally corresponds to the width of a teat and the broken portions of the line generally correspond to the proportions of the space between teats.

The operation of determining the location of the teats of the dairy livestock will now be discussed in more detail. Controller 200 may receive stored, historical coordinates signifying the location of a teat. For example, controller 200 may access historical data 184 signifying the location of teats of the dairy livestock in relation to some location on the dairy livestock, such as the center of the udder, the rear, and/or reference point 178. In certain embodiments, the center of the udder may be reference point 178.

Using this information, controller 200 may calculate reference coordinates for particular teats of the dairy livestock. Controller 200 may use reference coordinates to position robotic attacher 150 in the vicinity of a particular teat in order to subsequently determine a more accurate location of the particular teat using second camera 158*b*.

Controller 200 may begin by calculating a first reference coordinate. The first reference coordinate may be calculated using the stored coordinates of the teats (e.g., historical data 184) as well as the received coordinates of the center of the udder. For example, the stored coordinate may signify the distance from the center of an udder that a particular teat may be located. The first reference coordinate may be a coordinate signifying the distance from the center of the udder in a lateral direction towards the side of a dairy livestock in the z-dimension (as illustrated in FIGS. 3, 4A, and 4B).

Controller 200 may calculate a second reference coordinate. For example, the second reference coordinate may be calculated using the stored coordinates of the teats, the center of the udder, and a displacement measurement obtained using backplane 138. In certain embodiments, the second coordinate may be the distance from the rear of the cow to a particular teat based on the position of backplane 138 and the previously stored distance of the teat from the rear of the cow. Using this information, controller 200 may be able to calculate a second coordinate for a particular teat in the x-dimension (as depicted in FIGS. 3, 4A, and 4B). Controller 200 may also determine a third reference coordinate. The third reference coordinate may be a stored coordinate signifying the distance of the tip of a teat from the ground in a vertical dimension such as the y-dimension (as depicted in FIGS. 3, 4A, and 4B).

Using the reference coordinates, second camera 158*b* may be positioned near the teats of the dairy livestock. Robotic attacher 150 may move into position to scan the udder for teats. Robotic attacher 150 may move to the calculated reference coordinates. In certain embodiments, the reference coordinates may be slightly offset to avoid collision with one or more of the teats of the dairy livestock. According to some embodiments, robotic attacher 150 may move into position to allow second camera 158*b* to determine current coordinates of a particular teat of the dairy livestock. For example, the coordinates of the particular teat may correspond to coordinates in the x-, y-, and z-dimensions.

Controller 200 may begin to scan for the tip of a particular teat by utilizing second camera 158b. In certain embodiments, second camera 158b may generate second image 180 using lens 264 and transmitter 260 described in FIG. 4B below. Second image 180 may comprise data signifying the light intensity measurements of particular portions of the visual data captured by second image 180. Controller 200 may then scan second image 180 generated by second camera 158b to locate a first teat. In certain embodiments, analyzing second image 180 may include analyzing light intensity measurements captured by second camera 158b.

Controller 200 may calculate a first coordinate of the tip of a particular teat by analyzing second image 180. In certain embodiments, the first coordinate may be a coordinate in the z-dimension (as depicted in FIGS. 3, 4A, and 4B) of the dairy livestock. Controller 200 may begin to calculate the first coordinate of the teat of the dairy livestock using the data captured by second camera 158b. Controller 200 may begin to analyze second image 180 generated by second camera 158b in a vertical dimension relative to the dairy livestock. The light intensity measurements of a particular teat should appear in clusters of similar measurements. As the scan proceeds in a downward vertical direction and the light intensity measurements have been determined to deviate from the measurements of the teat, controller 200 may determine that the tip of the teat has been found and the coordinates of the particular teat may be calculated. In certain embodiments, controller 200 may determine the first coordinate based on one or more measurements of a collection of horizontal lines included in second image 180.

Controller 200 may then calculate a second coordinate of the particular teat. For example, the second coordinate may signify the distance from the tip of the teat hanging below an udder of a dairy livestock to the ground in the y-dimension (as depicted in FIGS. 3, 4A, and 4B). Using a process similar to calculating the first coordinate, controller 200 may also determine the second coordinate of the tip of the particular teat.

Controller 200 may also calculate a third coordinate of the particular teat. For example, the third coordinate may signify the distance between second camera 158b and the tip of the particular teat in an x-dimension (as depicted in FIGS. 3, 4A, and 4B). In certain embodiments, controller 200 may calculate the third coordinate of the tip of the particular teat based at least in part on the calculated second coordinate and the known angle $\theta_1$ between signal 262 of transmitter 260 and supplemental arm 154 relative to the x-dimension as depicted in FIG. 4B. Using the angle information (e.g., $\theta_1$), the second coordinate (or any other distance calculation), and a standard geometry equation based on the properties of triangles, controller 200 may calculate the third coordinate of the tip of the particular teat of the dairy livestock.

Controller 200 may also calculate the distance between the center of teat cup 168 and the tip of the teat based on the calculation of the third coordinate and the known distance between second camera 158b and teat cup 168. Finally, controller 200 may determine if there are any other teats for which the coordinates must be calculated. If there are other teats that remain for which coordinates need to be calculated, the process may repeat. The vision-based determination process described above facilitates the movement of robotic attacher 150 allowing for the proper attachment of teat cups 168 to teats of a dairy livestock, disinfection of teats by nozzle 182, or any other suitable action by robotic attacher 150. Furthermore, controller 200 is operable to detect a movement of the dairy livestock. In response to detecting the movement, controller 200 may re-calculate any coordinate previously calculated using first camera 158a and/or second camera 158b.

At any point in determining the location of teats, controller 200 may filter undesirable visual data. Controller 200 may detect undesirable visual data by determining whether any light intensity measurements exceed a particular threshold. For example, controller 200 may scan second image 180 searching for light intensity measurements that vary greatly in intensity from neighboring pixels. Controller 200 may also determine that the distance between particular pixels with similar light intensity measurements may be spaced too far apart. In these examples, light intensity measurements exceeding certain thresholds may signify objects other than the teats of a dairy livestock such as hair, dirt, fog, or a fly. In certain embodiments, controller 200 may instruct second camera 158b to generate two images. One image may be generated using the laser turned on and the other image may be generated while the laser is turned off. Using the light intensity measurements from both of these generated images, controller 200 may determine an ambient light measurement which will be taken into account when calculating the light intensity measurements of second image 180. If any light intensity measurements exceed a certain threshold, then controller 200 may filter such data. Such data may be determined to have captured an object that may lead to an erroneous calculation for the coordinates of a particular teat of the dairy livestock. For example, when calculating the coordinates of a particular teat, controller 200 may ignore filtered data in its calculations.

Particular embodiments of the present disclosure may provide one or more technical advantages. For example, in some embodiments, the system of the present disclosure includes multiple cameras to facilitate locating the teats of a dairy livestock. Using multiple cameras may improve the visibility of the teats and may facilitate attaching milking equipment from a position to the rear of the dairy livestock, rather than to the side of the dairy livestock as in certain conventional systems. Approaching from the rear of the dairy livestock makes it less likely that the livestock will be distracted by the milking equipment. Furthermore, approaching from the rear of the dairy livestock makes it less likely that the dairy livestock will kick the milking equipment, the vision system, or any other component of the system of the present disclosure. As another example, in some embodiments, the system of the present disclosure, in searching for the teats of a dairy livestock, may account for (1) a determined reference point relative to the dairy livestock, and/or (2) historical data describing a previous location of the teats relative to the reference point. Accounting for the determined reference point and/or the historical data in searching for the teats of a dairy livestock may allow for more accurate teat location, which may allow a robotic attacher to more efficiently attach milking equipment to the dairy livestock. In certain embodiments, the system of the present disclosure may filter visual data to more efficiently and accurately determine reference points and locations of the teats of a dairy livestock. In some embodiments, the system of the present disclosure may release milking equipment, such as a milking cup, in such a manner as to prevent the accidental detachment of the milking equipment and to ensure that the milking equipment is securely attached to the dairy livestock.

Although a particular implementation of the example system is illustrated and primarily described, the present disclosure contemplates any suitable implementation of the example system, according to particular needs. Moreover, although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

FIG. 4B illustrate an example of a side plan view of second camera 158b according to certain embodiments of the present disclosure. In certain embodiments, second camera 158b includes transmitter 260 that transmits signal 262 and lens 264 that receives a reflection of signal 262. Lens 264 may provide the reflection of signal 262 to image processing components operable to generate second image 180. In some embodiments, signal 262 comprises a two-dimensional laser signal. According to some embodiments, transmitter 264 may be a laser-emitting device. Transmitter 264 may transmit signal 262 as a horizontal plane oriented at a fixed angle $\theta_1$ relative to the x-axis of supplemental arm 154. For example, when second camera 158b is positioned in an upright orientation, angle $\theta_1$ may be configured at an upward angle between 5 and 35 degrees relative to the x-axis.

Figure 5A:
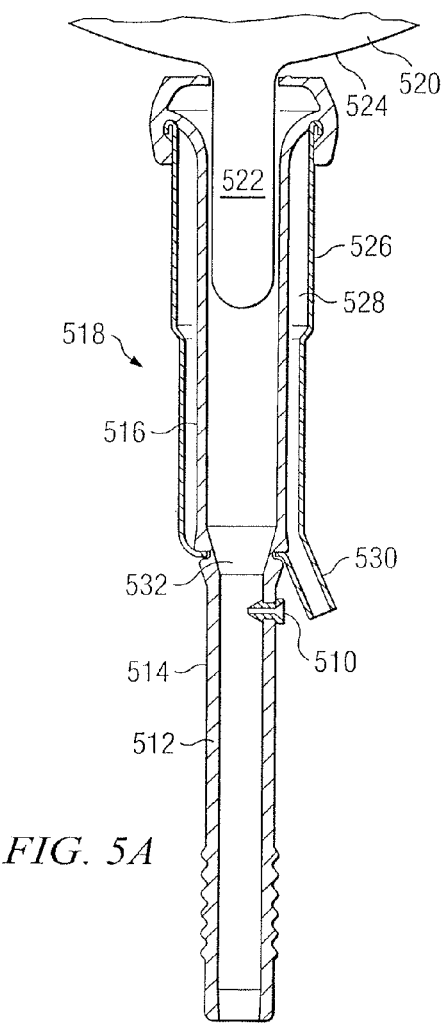
FIGS. 5A-5B illustrate an example teat cup assembly for milking dairy livestock such as a cow.
Figure 5B:
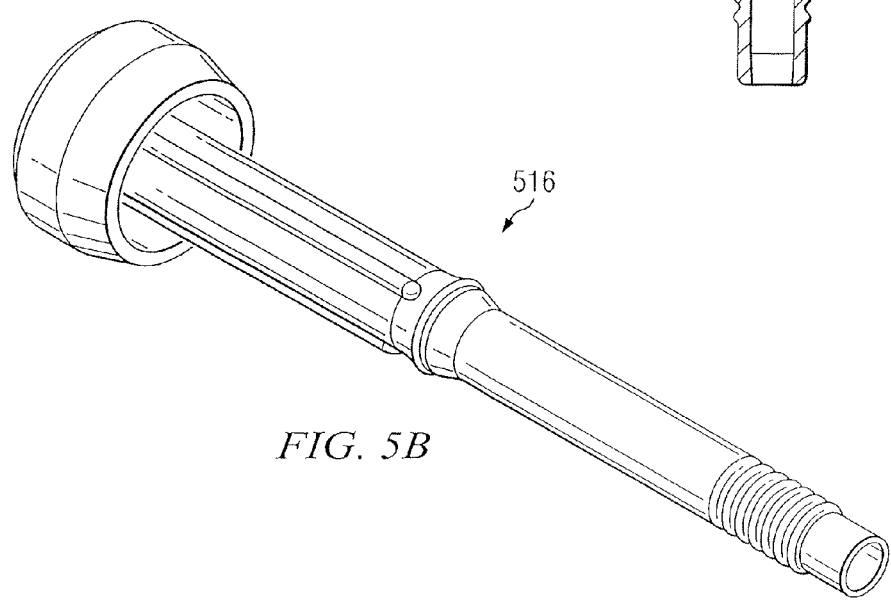

FIG. 5A illustrates teat cup assembly 518 for milking dairy livestock 520 such as a cow. In certain embodiments, teat cups 168 of FIG. 3 may include at least one teat cup assembly 518. Teat cup assembly 518 is shown for illustrative purposes only. The components of the present disclosure are capable of utilizing any suitable teat cup 168. In particular, teat 522, suspending from udder 524 of the dairy livestock, may extend into liner 516. In certain embodiments, teat cup shell 526 may typically be constructed from metal, plastic, or any other material suitable for a particular purpose. Teat cup shell 526 may be a member defining annular pulsation chamber 528 around liner 516 between liner 516 and teat cup shell 526. Teat cup shell 526 may include a pulsation port 530 for connection to a pulsator valve. According to some embodiments, liner 516 may be constructed from rubber or other flexible material suitable for a particular purpose. The lower end of milk tube portion 514 of liner 516 provides a connection to a milking claw, which in turn supplies milk to a storage vessel. Vacuum pressure is continuously applied to milk passage 532 within liner 516 through milk tube portion 514. Vacuum is alternately and cyclically applied to pulsation chamber 528 through port 530, to open and close liner 516 below teat 522. Air vent plug 510 may be inserted through wall 512 of milk tube portion 514 of teat liner 516. In certain embodiments, vacuum pressure may be applied to milk passage 532 within liner 516 as teat cup assembly 518 approaches teat 522 causing teat 522 to be drawn into teat cup assembly 518. Teat liner 516 is illustrated in isometric view in FIG. 5B.

Figure 6:
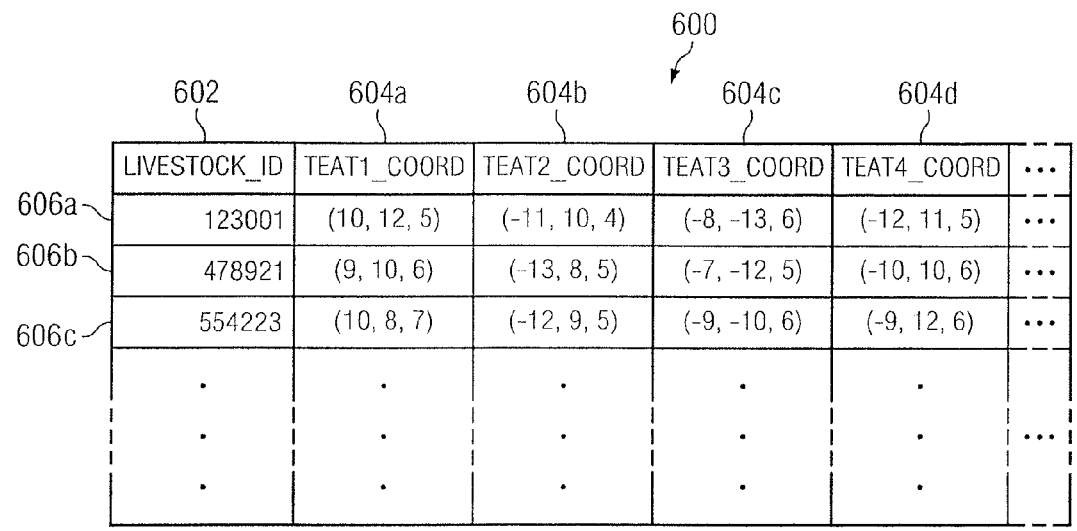
FIG. 6 illustrates example historical teat coordinate data which may be used by the example system of the present disclosure.

FIG. 6 illustrates example historical teat coordinate data which may be used by the example system of FIGS. 1-4. Example dataset of FIG. 6 is coordinate data 600 which may be used by controller 200 or any other suitable component. In certain embodiments, coordinate data 600 may be stored in memory 240 of controller 200. According to some embodiments, coordinate data 600 may be historical data 184. It should be understood that coordinate data 600 is provided for example purposes only. Coordinate data 600 is depicted as having a tabular structure for illustrative purposes only. Coordinate data 600 can be stored in a text file, a table in a relational database, a spreadsheet, a hash table, a linked list or any other suitable data structure capable of storing information. Moreover, the data relationships depicted are also for illustrative purposes only. For example, a particular ratio between data elements may be illustrated for example purposes only. Controller 200 is capable of handling data in any suitable format, volume, structure, and/or relationship as appropriate. Coordinate data 600 may contain dairy livestock identifier 602 and teat coordinates 604. In the illustrated example, records 606 are example entries of coordinate data 600 where each record 606 corresponds to a particular dairy livestock.

In certain embodiments, dairy livestock identifier 602 is an identifier that references a particular dairy livestock. Dairy livestock identifier 602 may be a number, a text string, or any other identifier capable of identifying a particular dairy livestock. In the current example, records 606 all include a number as dairy livestock identifier 602. For example, record 606a may represent a dairy livestock with dairy livestock identifier 602 of "123001." Record 606b may represent a dairy livestock with dairy livestock identifier 602 of "478921." Record 606c may represent a dairy livestock with dairy livestock identifier 602 of "554223."

Coordinate data 600 may also contain teat coordinates 604. Teat coordinates 604 may be historical coordinates for particular teats of a dairy livestock. For example, teat coordinates 604a-d each represent example coordinates for a particular one teat of a dairy livestock. In certain embodiments, each coordinate of teat coordinates 604 may represent the distance from the center of the udder of the dairy livestock in a particular dimension. Teat coordinates 604 may be in any suitable format and in any suitable measurement unit usable by controller 200 to calculate coordinates in real-time or for any other particular purpose. In the illustrated example, each record 606 contains a set of three coordinates for each teat in teat coordinates 604. Teat coordinates 604 may be coordinates in any suitable dimension. For example, the coordinates may represent the location of a particular teat in the x-, y-, and z-dimensions. In certain embodiments, teat coordinates 604 may correspond to coordinates in the left-right dimension, head-to-tail dimension, and the up-down dimension. In the illustrated example, record 606a may contain teat coordinates 604a of (10, 12, 5), teat coordinates 604b of (−11, 10, 4), teat coordinates 604c of (−8, −13, 6), and teat coordinates 604d of (−12, 11, 5). Record 606b may contain teat coordinates 604a of (9, 10, 6), teat coordinates 604b of (−13, 8, 5), teat coordinates 604c of (−7, −12, 5), and teat coordinates 604d of (−10, 10, 6). Record 606c may contain teat coordinates 604a of (10, 8, 7), teat coordinates 604b of (−12, 9, 5), teat coordinates 604c of (−9, −10, 6), and teat coordinates 604d of (−9, 12, 6).

FIG. 7 illustrates an example snapshot 700 of first image 176 identifying various portions of a dairy livestock. Example snapshot 700 may include located edges 702 corresponding to the edges of the hind legs of a dairy livestock. Example snapshot 700 may also include hip locations 704, outer hind locations 706, inner hind locations 708, udder edges 710, and center udder location 712. Controller 200 may be operable to determine located edges 702 from snapshot 700 as described above. For example, located edge 702a may correspond to an outer edge of a first hind leg of a dairy livestock. Located edge 702b may correspond to an inner edge of the first hind leg of the dairy livestock. Located edge 702c may correspond to an outer edge of a second hind leg of the dairy livestock. Located edge 702d may correspond to an inner edge of the second hind leg.

Controller 200 may be operable to determine various locations in the vicinity of the hind legs as discussed previously. For example, controller 200 may be operable to determine hip locations 704 of the dairy livestock. Hip location 704a may correspond to a located first hip of the diary livestock and hip location 704b may correspond to a located second hip of the dairy livestock. After determining hip location 704, controller 200 may be further operable to determine outer hind locations 706. For example, 706a may correspond to a located outer hind edge of a first hind leg of the dairy livestock and 706b may correspond to a located outer hind edge of a second hind leg of the dairy livestock. Controller 200 may also determine inner hind leg locations 708. For example, inner hind leg location 708a may correspond to a located inner hind edge of the first hind leg and 708b may correspond to a located inner hind edge of the second hind leg.

Controller 200 may be further operable to determine a position of the udder of the dairy livestock. In certain embodiments, controller 200 may determine the position of the udder of the dairy livestock based on the accessed first image 176 and/or the determined positions of the hind legs of the dairy livestock. For example, controller 200 may process first image 176 (which may change as vision system 158 moves toward the dairy livestock, as described above) in order to trace the located edges in depth corresponding to the inside of the hind legs of the dairy livestock (e.g., inner hind locations 708) upwardly until they intersect with the udder of the dairy livestock at udder edges 710. In certain embodiments, controller 200 may process first image 176 to determine where the edges in depth transition from being substantially vertical, indicating the inside of the hind legs, to substantially horizontal, indicating the udder. This location may correspond to udder edge 710. For example, udder edge 710a may correspond to the edge of the udder near one hind leg, while udder 710b may correspond to the edge of the udder near the other hind leg. Additionally, controller 200 may use udder edges 710a and 710b to calculate center udder location 712. In certain embodiments, center udder location 712 may be a location on the udder in the middle of udder edges 710a and 710b.

Controller 200, having determined the positions of each of the hind legs of the dairy livestock and the udder, may then communicate signals to one or more of actuators that may facilitate movement of robotic attacher 150 such that at least a portion of robotic attacher 150 (e.g., supplemental arm 154) extends toward the space between the hind legs of the dairy livestock (e.g., at a predetermined height relative to the milking stall in which the dairy livestock is located). Because first image 176 may comprise a three-dimensional video image, first image 176 may change in real time as first camera 158a moves toward the dairy livestock. Accordingly, the present disclosure contemplates that controller 200 may update, either continuously or at predetermined intervals, the determined leg positions as first image 176 changes.

Figure 8:
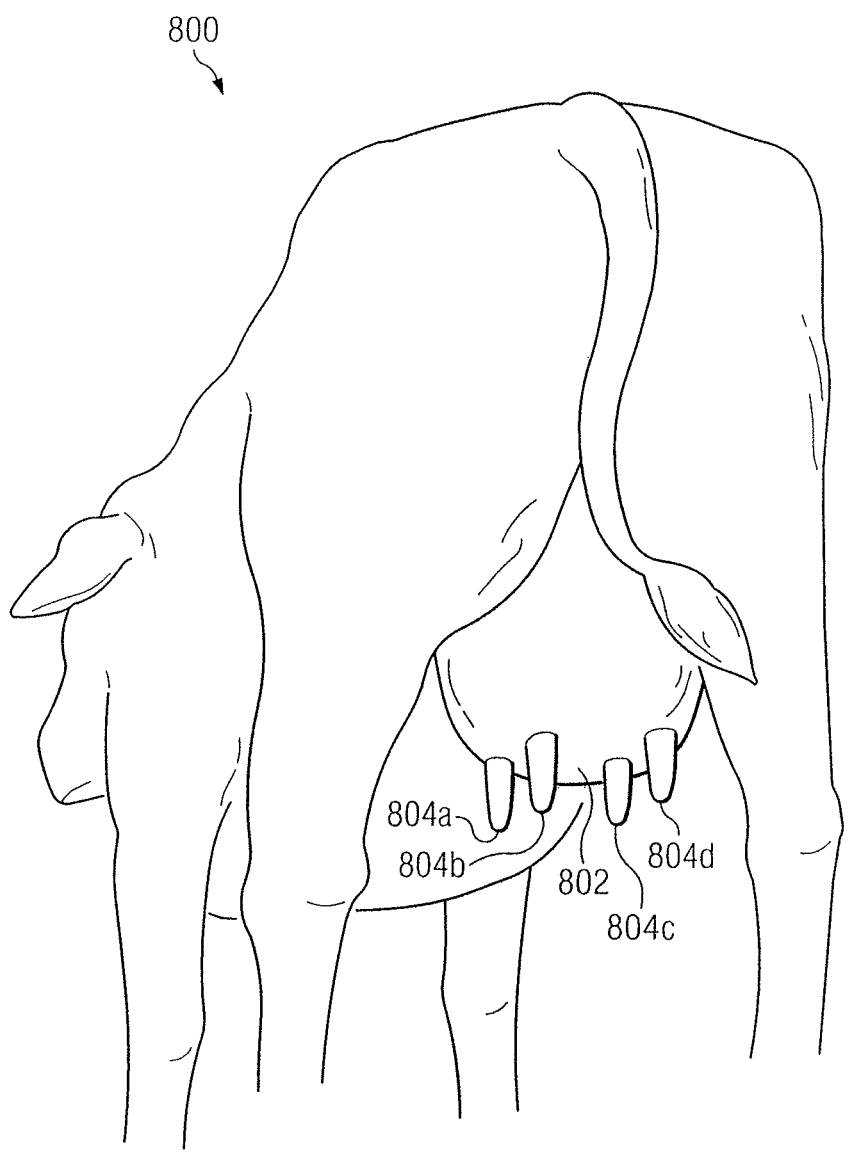
FIG. 8 illustrates an example dairy livestock that may be milked by the system of the present disclosure.

FIG. 8 illustrates an example dairy livestock that may be milked by the system of the present disclosure. Dairy livestock 800 includes udder center 802 and teat tips 804. Udder center 802 may be any location that generally may be considered the center of the udder of dairy livestock 800. In certain embodiments, udder center 802 may be determined by controller 200 using first camera 158a. According to some embodiments, udder center 802 may be reference point 178 or center udder location 712. Dairy livestock 800 also includes teat tips 804. In the illustrated example, dairy livestock includes teat tips 804a-d. In certain embodiments, the coordinates of teat tips 804a-d may be determined by controller 200 using second camera 158b. In some embodiments, the coordinates of teat tips 804a-d may be stored as historical data 184 in memory 240 as described in FIG. 4A above. According to some embodiments, teat tips 804a-d may be drawn into teat cup 168 to facilitate milking of dairy livestock 800.

Figure 9:
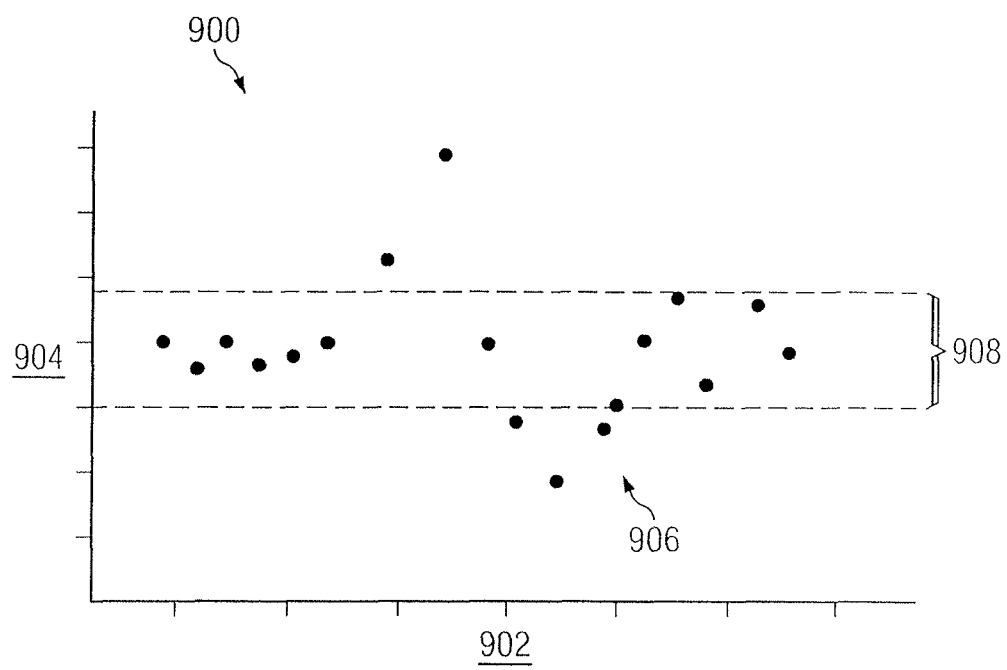
FIG. 9 illustrates an example three-dimensional visual data plot that may be used by the example system of the present disclosure.

FIG. 9 illustrates an example three-dimensional visual data plot that may be used by the example system of FIGS. 1-4. Example data plot 900 may be example analysis of first image 176 by controller 200. Example data plot 900 is provided for illustrative purposes only. Controller 200 may be capable of analyzing first image 176 in any manner suitable for a particular purpose. Example data plot 900 may include first axis 902, second axis 904, data points 906, and threshold band 908. First axis 902 may be any unit of measurement capable of denoting portions of first image 176 arranged in a particular dimension. For example, first axis 902 may be capable of representing the relative positions of a pixel to another pixel aligned in a particular dimension. In certain embodiments, first axis 902 may represent pixels aligned in a vertical dimension. In some embodiments, first axis 902 may represent pixels aligned in a horizontal dimension.

Second axis 904 may be any unit of measurement that may specify a distance in a particular dimension. For example, second axis 904 may represent the distance from first camera 158a to an object depicted in a particular portion, such as a pixel, of first image 176. Data points 906 may represent the distance of a particular portion of first image 176 in a particular dimension. For example, a data point 906 may signify the distance of a particular pixel from first camera 158a. Threshold band 908 may be any threshold that can be used by controller 200 to filter particular data. For example, controller 200 may filter data that is outside of threshold band 908, i.e., is too far or too close to first camera 158a. Controller 200 may determine that a cluster of pixels within threshold band 908 are part of the same object and pixels adjacent to that cluster that may fall outside of threshold band 908 may be part of a different object. This may signify that an edge of an object has been found by controller 200.

Figure 10:
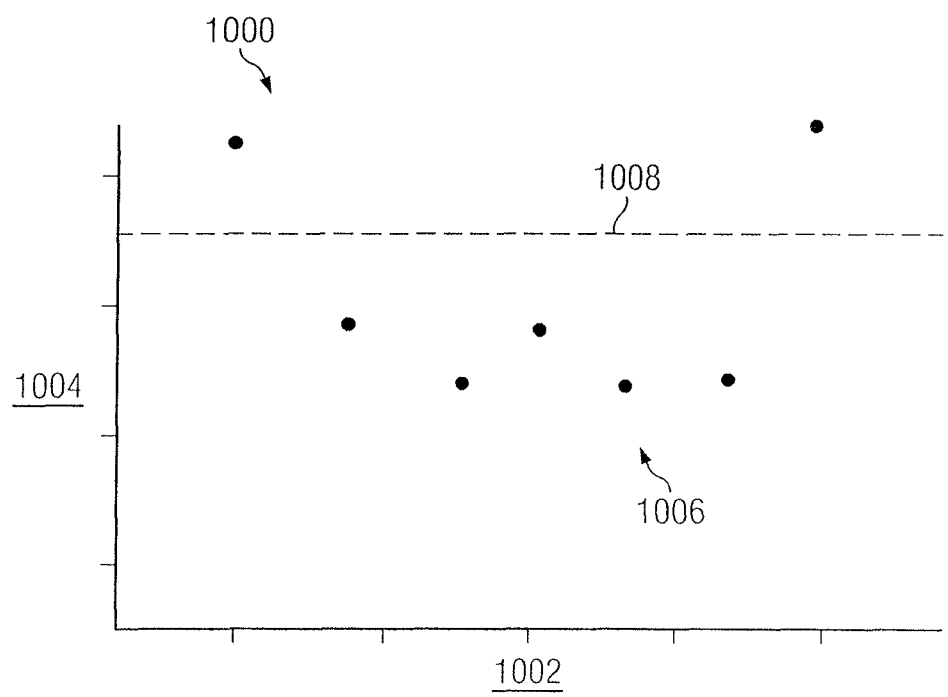
FIG. 10 illustrates an example two-dimensional visual data plot that may be used by the example system of the present disclosure.

FIG. 10 illustrates an example two-dimensional visual data plot that may be used by the example system of FIGS. 1-4. Example data plot 1000 may be example analysis of second image 180 by controller 200. Example data plot 1000 is provided for illustrative purposes only. Controller 200 may be capable of analyzing second image 180 in any manner suitable for a particular purpose. Example data plot 1000 may include first axis 1002, second axis 1004, data points 1006, and threshold 1008. First axis 1002 may be any unit of measurement capable of denoting portions of second image 180 arranged in a particular dimension. For example, first axis 1002 may be capable of representing the relative positions of a pixel to another pixel aligned in a particular dimension. In certain embodiments, first axis 1002 may represent pixels aligned in a vertical dimension. In some embodiments, first axis 1002 may represent pixels aligned in a horizontal dimension.

Second axis 1004 may be any unit of measurement that can be used to distinguish one cluster of pixels from another cluster of pixels. For example, second axis 1004 may represent the light intensity of a particular portion of second image 180. Data points 1006 may represent the light intensity of a particular portion of second image 180 in a particular dimension. For example, a data point 1006 may signify the light intensity of a particular pixel of second image 180. Threshold 1008 may be any threshold that can be used by controller 200 to filter particular data. For example, controller 200 may filter data that is outside of threshold 1008, i.e., the light intensity is too high signifying a reflection from a metal post, or other erroneous data. Controller 200 may determine that a cluster of pixels aligned closely together within threshold 1008 with similar light intensities are part of the same object and pixels adjacent to that cluster that may fall outside of threshold 1008, or otherwise have too dissimilar of a light intensity, may be part of a different object. This may signify that an edge of an object has been found by controller 200.

Figure 11A:
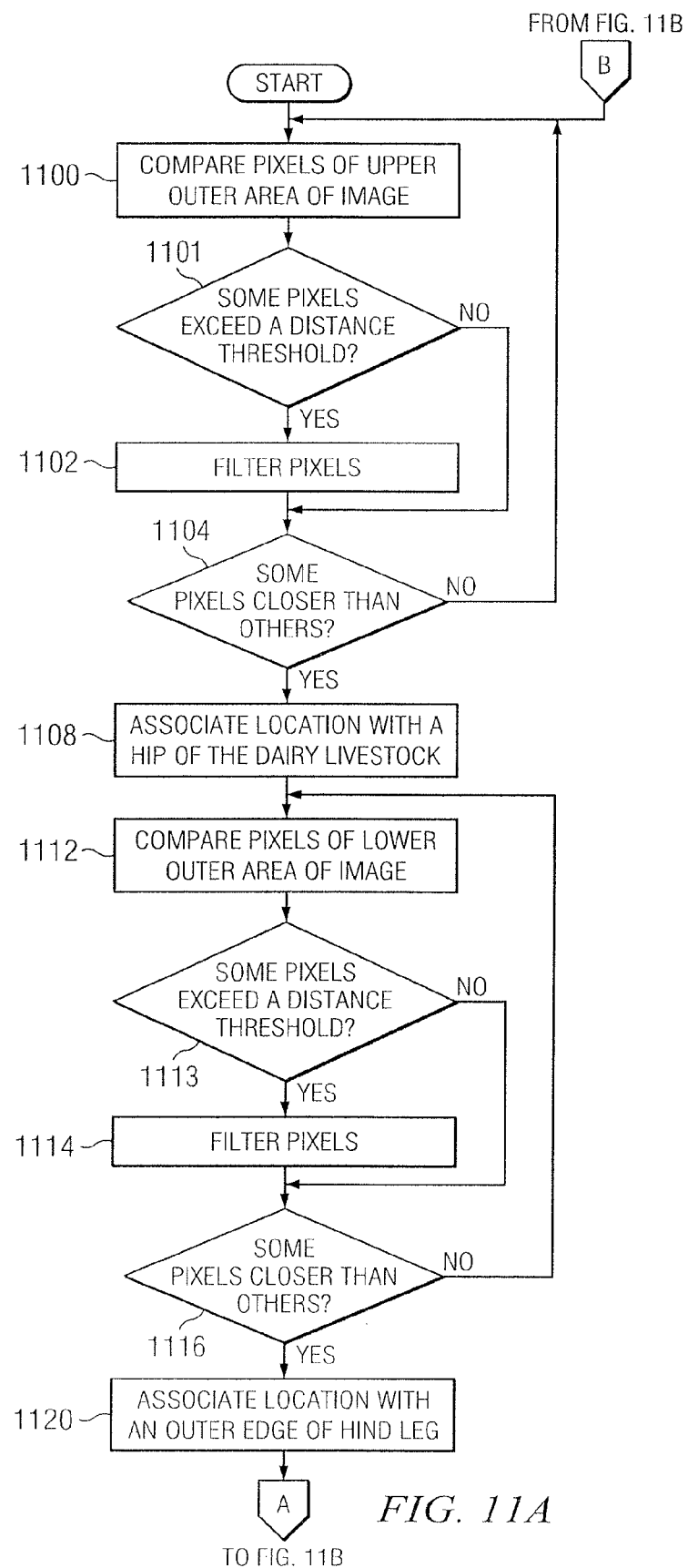
FIGS. 11A-11B illustrate an example method for analyzing an image captured by a three-dimensional camera.
Figure 11B:
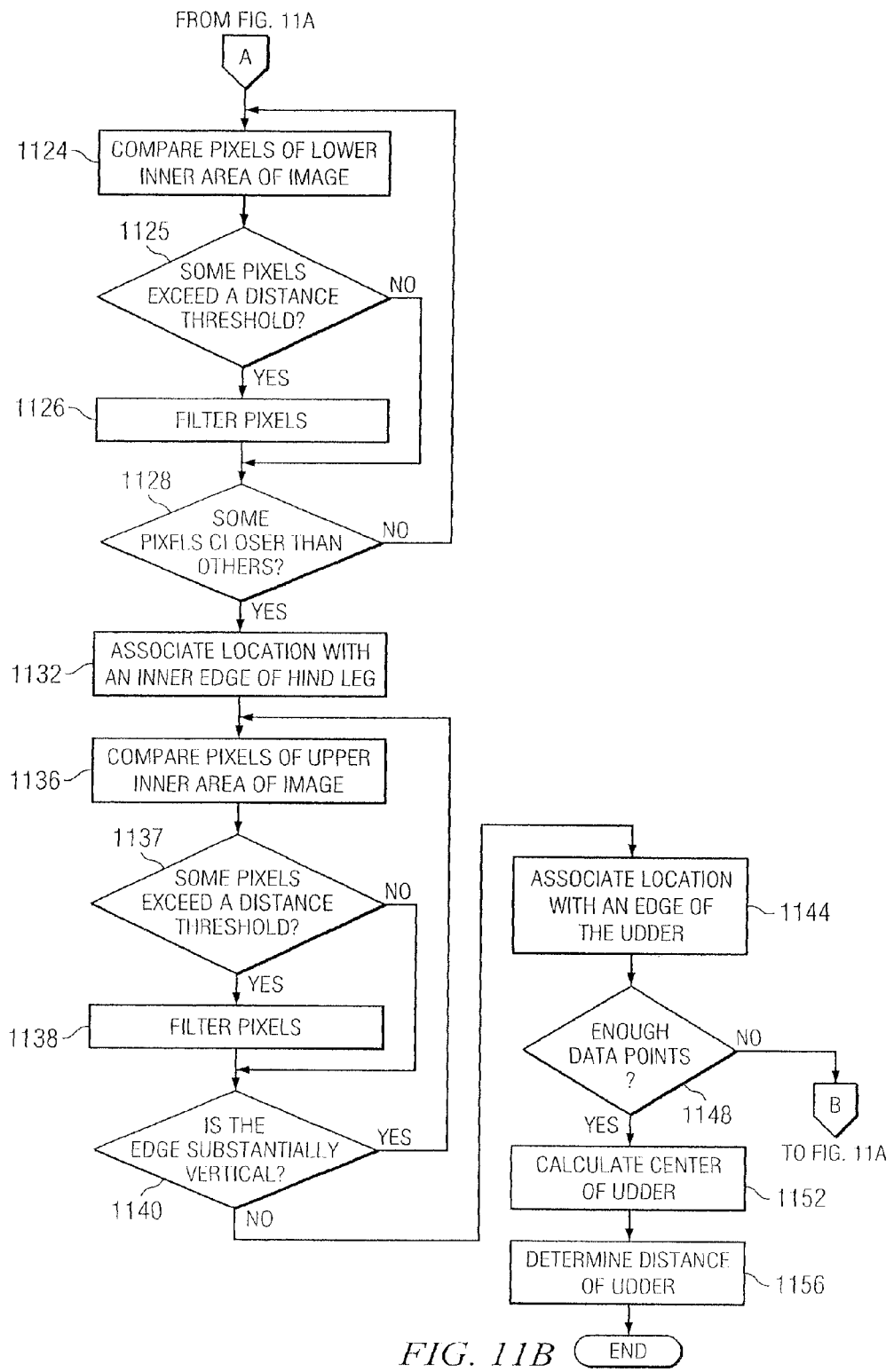

FIGS. 11A and 11B illustrate an example method for analyzing an image captured by a three-dimensional camera. The example method of FIG. 11 may be performed by the system of the present disclosure. According to certain embodiments of the present disclosure, the method may be implemented in any suitable combination of software, firmware, hardware, and equipment. Although particular components may be identified as performing particular steps, the present disclosure contemplates any suitable components performing the steps according to particular needs.

The example method may begin at step 1100. At step 1100, controller 200 may begin to compare pixels of an upper outer area of an image. For example, controller 200 may access first image 176 generated by first camera 158a. Controller 200 may compare the pixels of first image 176 by determining the depth of the pixels. In certain embodiments, the depth may be determined by measuring the time of flight of a light signal between first camera 158a and a particular object captured in first image 176. After collecting the depth information of a particular portion of pixels, the method may proceed to step 1101. At step 1101, controller 200 may determine whether some pixels exceed a distance threshold. Generally, depth information analyzed from first image 176 should stay fairly constant signifying that a particular object is being analyzed. However, controller 200 may determine that one or more pixels are too close to first camera 158a. Pixels that are too close to first camera 158a may suggest undesirable data has been captured by first camera 158a. Examples of undesirable data captured by first camera 158a may be a fly, a livestock's tail, dirt, fog, moisture, a reflection off a metal post in enclosure 100, or any other object that may interfere with controller 200 analyzing first image 176. As another example, controller 200 may determine that the measured depths of adjacent pixels are fluctuating, exceeding a certain threshold. As a further example, controller 200 may determine that measured depths of adjacent pixels are changing excessively, exceeding a certain threshold. If controller 200 has determined that some pixels do exceed a distance threshold and have depth information signifying certain pixels represent undesirable visual data captured by first camera 158a, then the example method may proceed to step 1102. Otherwise, the example method may proceed to step 1104.

Once it is determined that certain visual data exceeds a distance threshold, that data may be filtered. At step 1102, controller 200 may filter pixels containing depth information that exceeds a certain distance threshold. For example, controller 200 may determine that a certain set of pixels are too close to or too far from camera 158a and will eliminate those pixels from consideration when analyzing first image 176. Or controller 200 may have determined that certain adjacent pixels contained depth information that fluctuated. As another example, controller 200 may have determined that certain adjacent pixels contained depth information that changed excessively from pixel to pixel. All of these examples may be examples of data potentially filtered by controller 200.

Controller 200 may next attempt to locate particular edges of the dairy livestock by comparing the depth locations of various pixels to each other at step 1104. Controller 200 may determine whether some pixels are closer than other pixels. For example, controller 200 may compare the depth information of a group of pixels to determine if a portion of the pixels are closer than other portions of pixels. A cluster of pixels closer to first camera 158a may signify that an edge of a dairy livestock has been found. The cluster of pixels with depth information further away from camera 158a may signify that the image data is of an object other than an edge of the dairy livestock. If controller 200 has determined that some pixels are not closer than other pixels, then the example method may return to step 1100 and continue analyzing information captured by first camera 158a. Otherwise, the example method may proceed to step 1108.

At step 1108, controller 200 may associate the location of the cluster of pixels that are closer to first camera 158a with an edge of the dairy livestock. For example, controller 200 may have determined that the cluster of pixels represents a first edge corresponding to the hip of the dairy livestock. In certain embodiments, this location may correspond with hip location 704a of FIG. 7. Controller 200 may store this association in memory 240 or in any other suitable component of controller 200.

After finding the hip of the dairy livestock, controller 200 may attempt to locate the hind leg of the dairy livestock. To do this, at step 1112, controller 200 may compare the depth information of pixels in a lower outer area of first image 176 or any other portion of first image 176 that may include the hind legs of the dairy livestock. For example, controller 200 may traverse pixels of first image 176 in a downward direction trying to locate the outer edge of a hind leg of a dairy livestock. At step 1113, controller 200 may determine whether some pixels exceed a distance threshold. Controller 200 may make this determination similar to the determination in step 1101. If controller 200 has determined that some pixels exceed a distance threshold, then the example method may proceed to step 1114. Otherwise, the example method may proceed to step 1116. At step 1114, controller 200 may filter pixels containing depth information that exceeds a certain distance threshold. Controller 200 may filter pixels as discussed in step 1102.

Controller 200 may then proceed with determining the location of an outer edge of a hind leg at step 1116. Controller 200 may do this by determining whether some pixels are closer than other pixels. For example, controller 200 may compare the depth information of a group of pixels to determine if a portion of the pixels are closer than other portions of pixels. A cluster of pixels closer to first camera 158a may signify that an edge of a dairy livestock has been found. The cluster of pixels with depth information further away from camera 158a may signify that the image data is of an object other than an edge of the dairy livestock. If controller 200 has determined that some pixels are not closer than other pixels, then the example method may return to step 1112 and continue analyzing information captured by first camera 158a. Otherwise, the example method may proceed to step 1120.

At step 1120, controller 200 may associate the location of the cluster of pixels that are closer to first camera 158a with an edge of the dairy livestock. For example, controller 200 may have determined that the cluster of pixels represents an edge corresponding to an outer edge of a hind leg of the dairy livestock. In certain embodiments, this location may correspond with outer edge location 706a of FIG. 7. Controller 200 may store this association in memory 240 or in any other suitable component of controller 200.

Controller 200 may then attempt to determine an inner edge location of a hind leg. At step 1124, controller 200 may begin to scan the depth information of pixels along a lower inner area of first image 176. For example, controller 200 may traverse pixels along the z-dimension (as illustrated in FIGS. 3, 4A, and 4B) from outer edge location 706a to the center of first image 176 trying to locate an inner edge of the hind leg of the dairy livestock. At step 1125, controller 200 may determine whether some pixels exceed a distance threshold. Controller 200 may make this determination similar to the determination in step 1101. If controller 200 has determined that some pixels exceed a distance threshold, then the example method may proceed to step 1126. Otherwise, the example method may proceed to step 1128. At step 1126, controller 200 may filter pixels containing depth information that exceed a certain distance threshold. Controller 200 may filter pixels as discussed in step 1102.

Controller 200 may then proceed with determining the location of an inner edge of a hind leg at step 1128. Controller 200 may determine whether some pixels are closer than other pixels. For example, controller 200 may compare the depth information of a group of pixels to determine if a portion of the pixels are closer than other portions of pixels. A cluster of pixels closer to first camera 158a may signify that an edge of the dairy livestock has been found. The cluster of pixels with depth information further away from camera 158a may signify that the image data is of an object other than an edge of the dairy livestock. If controller 200 has determined that some pixels are not closer than other pixels, then the example method may return to step 1124 and continue analyzing information captured by first camera 158a. Otherwise, the example method may proceed to step 1132.

At step 1132, controller 200 may associate the location of the cluster of pixels that are closer to first camera 158a with an edge of the dairy livestock. For example, controller 200 may have determined that the cluster of pixels represents an edge corresponding to an inner edge of a hind leg of the dairy livestock. In certain embodiments, this location may correspond with inner edge location 708a of FIG. 7. Controller 200 may store this association in memory 240 or in any other suitable component of controller 200.

After locating the inner edge of the hind leg, controller 200 may search for the location of the udder of the dairy livestock. At step 1136, controller 200 may begin to scan the depth information of pixels along an upper area of first image 176. For example, controller 200 may scan pixels along a vertical dimension above the location of the inner edge found in step 1132, trying to locate an edge of the udder of the dairy livestock. In certain embodiments, this edge may be where the udder of the livestock meets an inner edge of a hind leg of the dairy livestock. At step 1137, controller 200 may determine whether some pixels exceed a distance threshold. Controller 200 may make this determination similar to the determination in step 1101. If controller 200 has determined that some pixels exceed a distance threshold, then the example method may proceed to step 1138. Otherwise, the example method may proceed to step 1140. At step 1138, controller 200 may filter pixels containing depth information that exceed a certain distance threshold. Controller 200 may filter pixels as discussed in step 1102.

Continuing to determine the location of the udder edge, at step 1140, controller 200 may determine whether the edges in depth of first image 178 have transitioned from being substantially vertical to substantially horizontal. For example, controller 200 may compare the depth information of a group of pixels to determine if a portion of the pixels are closer than other portions of pixels. A cluster of pixels closer to first camera 158a than other clusters may signify that an edge has been found. If the located edge is substantially vertical, the edge of the udder has not been found and the example method may return to step 1136 and controller 200 may continue to scan information captured by first camera 158a. If controller 200 has determined that the located edge has is substantially horizontal, an edge of the udder may have been found. This location may signify where the edges in depth transition from being substantially vertical, indicating the inside of the hind legs, to substantially horizontal, indicating the udder. The example method may proceed to step 1144.

At step 1144, controller 200 may associate the location of the cluster of pixels where pixels are no longer substantially closer to first camera 158a than other pixels with an edge of the dairy livestock. For example, controller 200 may have determined that the cluster of pixels represents an edge corresponding to an udder edge of the dairy livestock where the udder meets the hind leg. In certain embodiments, this location may correspond with udder edge location 710a of FIG. 7. Controller 200 may store this association in memory 240 or in any other suitable component of controller 200.

After finding the edges corresponding to a side of the dairy livestock, controller 200 may determine if data points from both sides of the dairy livestock have been collected at step 1148. In certain embodiments, this determination may be based on whether controller 200 has enough data points to calculate a center location of the udder of the dairy livestock. For example, controller 200 may use at least two locations of the udder to calculate the center of the udder (e.g., center location 712 of FIG. 7), where each location identifies where the udder intersects with each hind leg (e.g., udder edges 710). If controller 200 determines that only a single udder edge 710 has been found, controller 200 may proceed to determine the locations of the other hind leg and the other udder edge 710 of the dairy livestock at step 1100. Otherwise, the example method may proceed to step 1152.

After determining edge locations for both sides of the dairy livestock, at step 1152, controller 200 may calculate a center location of the udder. For example, controller 200 may calculate center location 712 of FIG. 7 based on the acquired locations in the prior steps. In certain embodiments, the center location may be determined by calculating a coordinate that is approximately equidistant from each determined udder edge. For example, location 712 of FIG. 7 may be calculated by finding the center point between udder edge locations 710a and 710b of FIG. 7. Finally, at step 1156, controller 200 may determine the depth location of the center of the udder. In certain embodiments, controller 200 may determine the depth location by analyzing visual data captured by first camera 158a. In other embodiments, the depth location of the center of the udder may be calculated by using historical data 184 of the udder's location in relation to another portion of the dairy livestock, as well as a displacement measurement of the dairy livestock within a particular stall.

Figure 12:
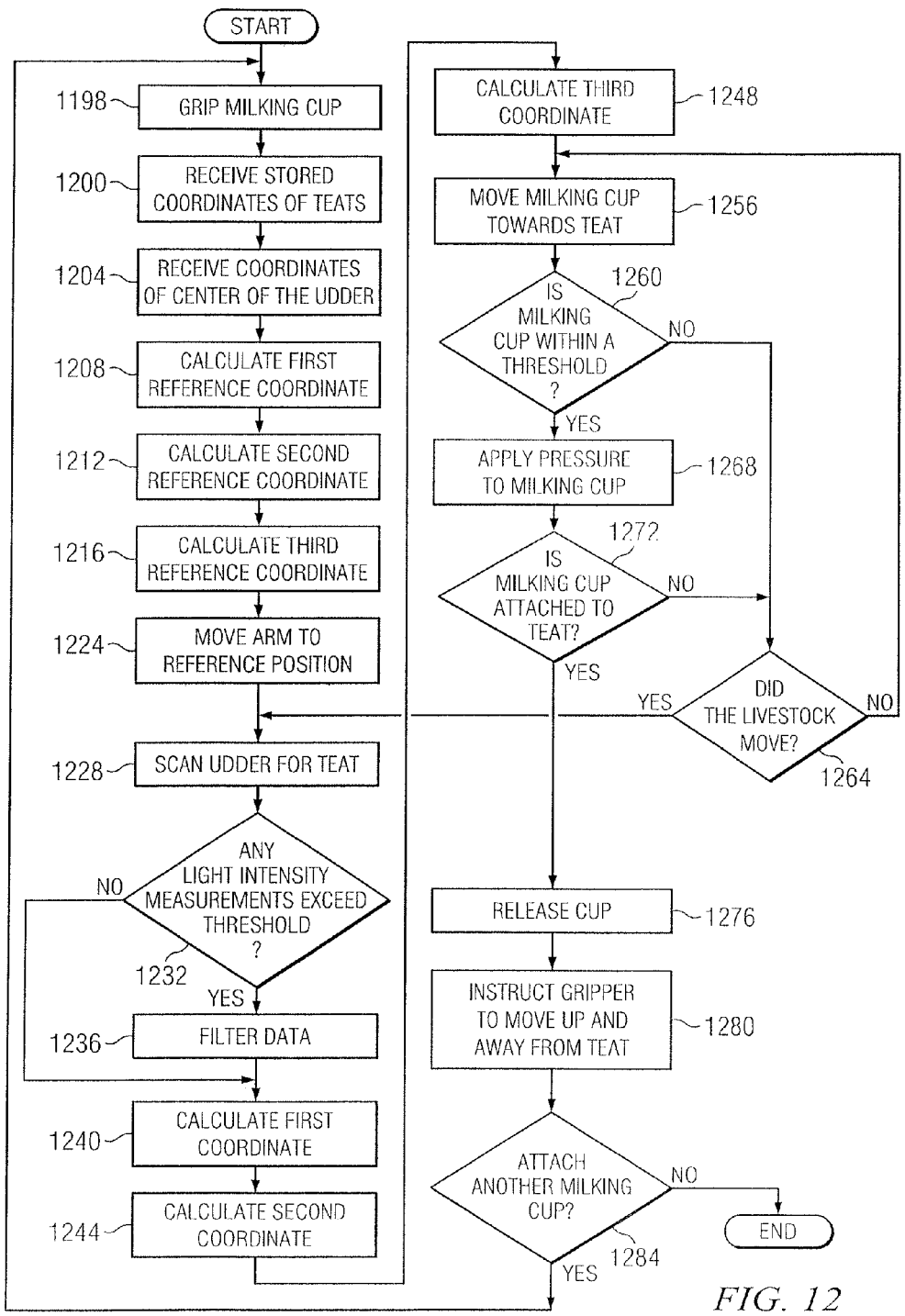
FIG. 12 illustrates an example method for determining the coordinates of teats of a dairy livestock and attaching milking cups to the teats.

FIG. 12 illustrates an example method for determining the coordinates of teats of a dairy livestock and attaching milking cups to the teats. The example method of FIG. 12 may be performed by the example system of the present disclosure. The method may be implemented in any suitable combination of software, firmware, hardware, and equipment. Although particular components may be identified as performing particular steps, the present disclosure contemplates any suitable components performing the steps according to particular needs.

The example method may begin at step 1198. At step 1198, gripping portion 156 may grip teat cup 168 and be positioned near the rear of the dairy livestock. At step 1200, stored coordinates signifying the location of teats may be received. For example, controller 200 of FIG. 3 may access a set of historical coordinates (e.g., historical data 184) signifying the location of teats of a dairy livestock in relation to some location on the dairy livestock, such as the center of the udder, the rear, and/or reference point 178. In certain embodiments, the center of the udder may be reference point 178. At step 1204, controller 200 may receive coordinates of a center of the udder of the dairy livestock. In certain embodiments, the coordinates for the center of the udder of the dairy livestock may be received after analyzing first image 176 generated by first camera 158a. The example method of FIG. 11 may be one method for determining the center of the udder of a dairy livestock in real-time.

At step 1208, controller 200 may calculate a first reference coordinate for a particular teat. The first reference coordinate may be calculated using the stored coordinates of the particular teat (e.g., historical data 184) as well as the received coordinates of the center of the udder. For example, the stored coordinate may signify the distance from the center of an udder that that particular teat may be located. The first reference coordinate may be a coordinate signifying the distance of the particular teat from the center of the udder in a lateral direction towards the side of a dairy livestock in the z-dimension (as illustrated in FIGS. 3, 4A, and 4B).

At step 1212, controller 200 may calculate a second reference coordinate for the particular teat. For example, the second reference coordinate may be calculated using the stored coordinates of the particular teat, the center of the udder, and a displacement measurement obtained using backplane 138. In certain embodiments, the second coordinate may be the distance from the rear of the cow to the particular teat based on the position of backplane 138 and the previously stored distance of the teat from the rear of the cow. Using this information, controller 200 may be able to calculate a second coordinate for the particular teat in the x-dimension (as depicted in FIGS. 3, 4A, and 4B). At step 1216, controller 200 may also determine a third reference coordinate for the particular teat. The third reference coordinate may be a stored coordinate signifying the distance of the tip of the particular teat from the ground in a vertical dimension such as the y-dimension (as depicted in FIGS. 3, 4A, and 4B).

Once reference coordinates for a particular teat are determined, steps may be taken to prepare robotic attacher 150 for attaching teat cup 168 to the particular teat. At step 1224, using the reference coordinates calculated, second camera 158b may be positioned near the teats of the dairy livestock. Robotic attacher 150 may move into position to scan the udder for teats by moving to the calculated reference coordinates. In certain embodiments, the reference coordinates may be slightly offset to avoid collision with one or more of the teats of the dairy livestock. According to some embodiments, robotic attacher 150 may move into position to allow second camera 158b to determine current coordinates of a particular teat of the dairy livestock. For example, the coordinates of the particular teat may correspond to coordinates in the x-, y-, and z-dimensions.

Once in position, controller 200 may start to scan the udder for a particular teat. At step 1228, controller 200 may begin by scanning for the tip of a particular teat using second camera 158b. In certain embodiments, second camera 158b may generate second image 180 using lens 264 and transmitter 260. Second image 180 may comprise data signifying the light intensity measurements of particular portions of the visual data captured by second image 180. Controller 200 may then analyze second image 180 generated by second camera 158b to locate a first teat. In certain embodiments, analyzing second image 180 may include analyzing light intensity measurements captured by second camera 158b.

In determining the location of teats, controller 200 may also determine whether any undesirable visual data may be filtered. At step 1232, controller 200 may determine whether any light intensity measurements exceed a particular threshold. For example, controller 200 may scan second image 180 searching for light intensity measurements that vary beyond a threshold amount in intensity from neighboring pixels. Controller 200 may also determine that the distance between particular pixels with particularly similar light intensity measurements may be spaced too far apart. In these examples, light intensity measurements exceeding certain thresholds may signify objects other than the teats of a dairy livestock such as hair, dirt, fog, or a fly.

In certain embodiments, controller 200 may instruct second camera 158b to generate two images. One image will be generated using the laser turned on and the other image will be generated while the laser is turned off. Using the light intensity measurements from both of these generated images, controller 200 may determine an ambient light measurement which will be taken into account when calculating the light intensity measurements of second image 180. If any light intensity measurements exceed a certain threshold, then the example method may proceed to step 1236. Otherwise, the example method may proceed to step 1240. At step 1236, controller 200 may filter data that is determined to exceed a certain threshold. Such data may be determined to have captured an object that may lead to an erroneous calculation for the coordinates of a particular teat of the dairy livestock. For example, when calculating the coordinates of a particular teat, controller 200 may ignore filtered data in its calculations.

After scanning the udder for a teat has been initiated, controller 200 may begin to calculate the actual coordinates of a particular teat location. At step 1240, controller 200 may calculate a first coordinate of the tip of a particular teat. In certain embodiments, the first coordinate may be a coordinate in the z-dimension (as depicted in FIGS. 3, 4A, and 4B) of the dairy livestock. Controller 200 may begin to calculate the first coordinate of the teat of the dairy livestock using the data captured by second camera 158b. Controller 200 may begin to analyze second image 180 generated by second camera 158b in a vertical dimension relative to the dairy livestock. The light intensity measurements of a particular teat should appear in clusters of similar measurements. As the scan proceeds in a downward vertical direction and the light intensity measurements have been determined to deviate from the measurements of the teat, controller 200 may determine that the tip of the teat has been found and the coordinates of the particular teat may be calculated. In certain embodiments, controller 200 may determine the first coordinate based on one or more measurements of a collection of horizontal lines included in second image 180.

At step 1244, controller 200 may calculate a second coordinate of the particular teat. For example, the second coordinate may signify the distance from the tip of the teat hanging below an udder of a dairy livestock to the ground in the y-dimension (as depicted in FIGS. 3, 4A, and 4B). Using a process similar to calculating the first coordinate in step 1240, controller 200 may also determine the second coordinate of the tip of the particular teat.

At step 1248, controller 200 may calculate a third coordinate of the particular teat. For example, the third coordinate may signify the distance between second camera 158b and the tip of the particular teat in an x-dimension (as depicted in FIGS. 3, 4A, and 4B). In certain embodiments, controller 200 may calculate the third coordinate of the tip of the particular teat based at least in part on the calculated second coordinate and the known angle $\theta_1$ between signal 262 of transmitter 260 and supplemental arm 154 relative to the x-dimension as depicted in FIG. 4B. Using the angle information (e.g., $\theta_1$), the second coordinate (or any other distance calculation), and a standard geometry equation based on the properties of triangles, controller 200 may calculate the third coordinate of the tip of the particular teat of the dairy livestock. Controller 200 may also calculate the distance between the center of teat cup 168 and the tip of the teat based on the calculation of the third coordinate and the known distance between second camera 158b and teat cup 168.

At this point, controller 200 may facilitate the attachment of teat cup 168 to a particular teat. At step 1256, teat cup 168 may be moved towards a teat of a dairy livestock. For example, teat cup 168 may be moved to a particular set of coordinates provided by controller 200. In certain embodiments, teat cup 168 may be positioned under a teat of the dairy livestock based on the coordinates calculated in steps 1240, 1244, and 1248 above. Once positioned in the vicinity of the teat, teat cup 168 may begin to be moved towards the actual calculated location of a particular teat. For example, supplemental arm 154 may be instructed by controller 200 to maneuver in an upward direction towards a particular teat. At step 1260, controller 200 may determine whether teat cup 168 is within a particular threshold. If teat cup 168 is not within a particular threshold, the example method may proceed to step 1264. Otherwise, the example method may proceed to step 1268.

At step 1264, controller 200 may attempt to determine whether it is appropriate to initiate the recalculation of the actual location of a particular teat. Generally, attaching teat cup 168 to a particular teat is a feedback-based process where the actual location of a particular teat may be determined and updated as appropriate until teat cup 168 is attached to the particular teat. Based at least in part upon visual data captured by vision system 158, controller 200 may fine-tune the current coordinates of the particular teat. Calculating (and potentially re-calculating) the actual location of a particular teat allows controller 200 to accurately determine the location of the particular teat during the attachment process until teat cup 168 is attached to a particular teat. For example, the livestock may move and it may be appropriate to update the actual coordinates of a particular teat based on visual data captured by vision system 158. If this is the case, the example method may proceed back to step 1228 to determine updated coordinates of the particular teat. Otherwise, teat cup 168 may continue to be moved towards the teat of the dairy livestock as the example method returns to step 1256.

If teat cup 168 is within a threshold distance of a particular teat, then, at step 1268, pressure may be applied to teat cup 168. In certain embodiments, this may be vacuum pressure applied to teat cup 168 by a pulsation device. By applying vacuum pressure to teat cup 168, teat cup 168 may draw in a particular teat for milking into teat cup 168. At step 1272, it may be determined whether a particular teat has been drawn into teat cup 168. If the teat is determined to not have been drawn into teat cup 168, the example method may proceed to step 1264. Otherwise, the example method may proceed to step 1276. At step 1276, controller 200 may provide an instruction for gripping portion 156 to release teat cup 168. At step 1280, controller 200 may instruct supplemental arm 154 to move gripping portion 156 upwards and away at a particular angle from the teat of the dairy livestock. By instructing gripping portion 156 to move up and away from the particular teat of the dairy livestock at a particular angle, the possibility of gripping portion 156 to detach teat cup 168 is decreased. At step 1284, controller 200 may determine whether another teat cup 168 may be attached. If another teat cup 168 may be attached, then the example method may proceed to step 1198. Otherwise, the example method may end.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for processing an image, comprising:
   a three-dimensional camera that captures an image of a dairy livestock;
   a processor communicatively coupled to the three-dimensional camera, wherein the processor:
   accesses a first pixel having a first depth location;
   accesses a second pixel having a second depth location;
   accesses a third pixel having a third depth location;
   compares the first depth location to the second depth location;
   compares the second depth location to the third depth location;
   compares the first depth location to the third depth location;
   determines that the second pixel is an outlier among the first pixel and the third pixel based upon the comparisons of the first depth location, the second depth location, and the third depth location;
   discards the second pixel from the image based at least in part upon the determination.

2. The system of claim 1, wherein the second pixel is further away from the three-dimensional camera than the first pixel.

3. The system of claim 1, wherein the second pixel is closer to the three-dimensional camera than the first pixel.

4. The system of claim 1, wherein the first pixel and the third pixel comprises visual data of the dairy livestock and the second pixel comprises visual data of an object other than the dairy livestock.

5. The system of claim 1, wherein the image of the dairy livestock comprises an image of a rear portion of the dairy livestock.

6. The system of claim 1, wherein the processor determines the first depth location by measuring the time of flight of a light signal between the three-dimensional camera and an object represented by the first pixel.

7. The system of claim 1, wherein the first pixel, the second pixel, and the third pixel are adjacent pixels of the image.

8. A method for processing an image, comprising:
accessing an image of at least a dairy livestock;
accessing a first pixel of the image, wherein the first pixel has a first depth location;
accessing a second pixel of the image, wherein the second pixel has a second depth location;
accessing a third pixel of the image, wherein the third pixel has a third depth location;
comparing, by a processor, the first depth location to the second depth location, the second depth location to the third depth location, and the first depth location to the third depth location;
determining, by the processor, that the second pixel is an outlier among the first pixel and the third pixel based upon the comparisons of the first depth location, the second depth location, and the third depth location; and
discarding, by the processor, the second pixel from the image based at least in part upon the determination.

9. The method of claim 8, wherein the second pixel is further away from the three-dimensional camera than the first pixel.

10. The method of claim 8, wherein the second pixel is closer to the three-dimensional camera than the first pixel.

11. The method of claim 8, wherein the first pixel and the plurality of third pixels comprise visual data of the dairy livestock and the second pixel comprises visual data of an object other than the dairy livestock.

12. The method of claim 8, wherein the image of the dairy livestock comprises an image of a rear portion of the dairy livestock.

13. The method of claim 8, wherein determining the first depth location comprises measuring the time of flight of a light signal between the three-dimensional camera and an object represented by the first pixel.

14. The method of claim 8, wherein the first pixel, the second pixel, and the third pixel are adjacent pixels of the image.

* * * * *